United States Patent
Yamada et al.

(10) Patent No.: US 11,104,844 B2
(45) Date of Patent: Aug. 31, 2021

(54) ORGANIC COMPOUND, ELECTROCHROMIC DEVICE, OPTICAL FILTER, IMAGE PICKUP APPARATUS, WINDOW, AND ELECTROCHROMIC MIRROR

(71) Applicant: CANON KABUSHIKI KAISHA, Tokyo (JP)

(72) Inventors: Kenji Yamada, Yokohama (JP); Satoshi Igawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 16/452,263

(22) Filed: Jun. 25, 2019

(65) Prior Publication Data

US 2020/0004095 A1    Jan. 2, 2020

(30) Foreign Application Priority Data

Jun. 28, 2018 (JP) .............................. JP2018-123696

(51) Int. Cl.
  *G02F 1/153* (2006.01)
  *G02F 1/1516* (2019.01)
  (Continued)

(52) U.S. Cl.
  CPC ............ *C09K 9/02* (2013.01); *C07F 9/65844* (2013.01); *G03B 11/00* (2013.01);
  (Continued)

(58) Field of Classification Search
  CPC .................. G02F 1/1516; G02F 1/1533; G02F 2202/021; C07F 9/65844
  See application file for complete search history.

(56) References Cited

FOREIGN PATENT DOCUMENTS

| JP | 2007-171781 A | 7/2007 | |
|---|---|---|---|
| JP | 2007171781 A * | 7/2007 | ............. G02F 1/155 |
| JP | 2016-169201 A | 9/2016 | |

OTHER PUBLICATIONS

Stefan Durben and Thomas Baumgartner, 3,7-Diazadibenzophosphole Oxide: A Phosphorus-Bridged Viologen Analogue with Significantly Lowered Reduction Threshold, Angew. Chem. Int. Ed. 2011, 50, 7948-7952. (Year: 2011).*

(Continued)

*Primary Examiner* — Bijan Ahvazi
(74) *Attorney, Agent, or Firm* — Canon U.S.A., Inc., IP Division

(57) ABSTRACT

An organic compound denoted by formula [1],

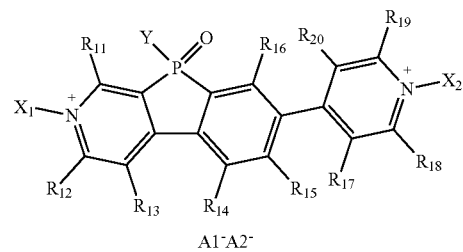

where each of $X_1$ and $X_2$ is independently selected from an alkyl group optionally having a substituent, an aryl group optionally having a substituent, and an aralkyl group optionally having a substituent, each of $R_{11}$ to $R_{20}$ is independently selected from a hydrogen atom and a substituent, Y represents an alkyl group optionally having a substituent or an (Continued)

aryl group optionally having a substituent, and each of $A_1^-$ and $A_2^-$ independently represents a monovalent anion.

19 Claims, 6 Drawing Sheets

(51) Int. Cl.
    *C07F 9/6584*      (2006.01)
    *C09K 9/02*      (2006.01)
    *G03B 11/00*      (2021.01)

(52) U.S. Cl.
    CPC ................. *C09K 2211/1018* (2013.01); *C09K 2211/1044* (2013.01); *G02F 1/1516* (2019.01); *G02F 1/1533* (2013.01); *G02F 2202/021* (2013.01)

(56) References Cited

OTHER PUBLICATIONS

Durben et al., "3,7-Diazadibenzophosphole Oxide: A Phosphorus-Bridged Viologen Analogue with Significantly Lowered Reduction Threshold**", Angew. Chem. Int. Ed., vol. 50, 7948-7952, 2011.

\* cited by examiner

ORGANIC COMPOUND, ELECTROCHROMIC DEVICE, OPTICAL FILTER, IMAGE PICKUP APPARATUS, WINDOW, AND ELECTROCHROMIC MIRROR

BACKGROUND OF THE INVENTION

Field of the Invention

The present disclosure relates to an electrochromic organic compound, an electrochromic device, an optical filter, an image pickup apparatus, window, and an electrochromic mirror.

Description of the Related Art

An electrochromic device is a device including a pair of electrodes and an electrochromic layer disposed between the pair of electrodes. The device adjusts the amount of light that passes through the electrochromic layer by applying a voltage to the pair of electrodes. In the present specification, "electrochromic" may be abbreviated as "EC".

The electrochromic layer contains an electrochromic compound in which optical absorption properties (coloration state and optical transmittance) of a substance change due to an electrochemical oxidation-reduction reaction. Regarding the EC compound, various materials, for example, inorganic materials, organic polymer materials, and low-molecular-weight materials, are known.

Representative examples of the organic low-molecular-weight EC compound include viologen derivatives which are colored due to reduction (cathodic compounds) and oligothiophene derivatives which are colored due to oxidation (anodic compounds).

Automobile dimming mirrors, electronic paper, and the like are known as applications of the EC devices. These EC devices exploit characteristics that various color tones are displayed by selecting a material. When applications to full-color displays and the like are intended, compounds that are colored to cyan, magenta, and yellow are needed. When applications to a wider range of uses are intended, an EC material having various absorption wavelengths in a colored state is needed. Therefore, organic EC materials that enable a variety of color designs to be performed by molecular design have attracted attention.

Regarding the viologen derivatives which are organic low-molecular-weight cathodic EC compound, various structures are known. In addition, it is known that when a conjugate structure of a bipyridinium skeleton of viologen is extended, the absorption wavelength is shifted to a long wavelength side.

Japanese Patent Laid-Open No. 2007-171781 (hereinafter Patent Literature 1) describes that an organic compound denoted by structural formula C-1 below in which a benzene ring is bonded between two pyridine rings has absorption in a range in the vicinity of 500 nm in a reduction-colored state. Japanese Patent Laid-Open No. 2016—(hereinafter Patent Literature 2) describes an organic compound denoted by structural formula C-2 below in which a pyridine ring is bonded between two pyridine rings. S. Durben and T. Baumgartner, Angew. Chem. Int. Ed., Vol. 50, 7948-7952, 2011 (hereinafter Non Patent Literature 1) describes an organic compound denoted by structural formula C-3 below.

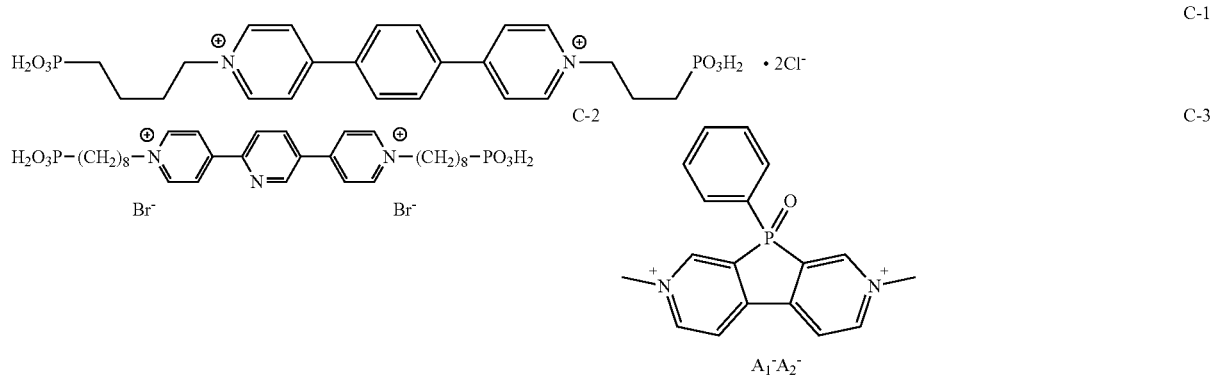

EC materials are required that the light absorption wavelength (form of absorption spectrum) does not change greatly in accordance with the temperature during use, that is, temperature dependency is low. However, regarding the cathodic EC compounds described in Patent Literature 1 and Patent Literature 2, the coloring absorption spectra may change in accordance with the temperature.

The cathodic EC compound described in Non Patent Literature 1 is a compound having low oscillator strength and, therefore, a compound having low absorbance.

SUMMARY OF THE INVENTION

The present disclosure is realized in consideration of the above-described disadvantages, and it is an aspect of the present disclosure to provide an EC compound having an absorption spectrum with low temperature dependency in a colored state and having high absorbance.

According to an embodiment of the present disclosure, an organic compound denoted by formula [1] below is provided.

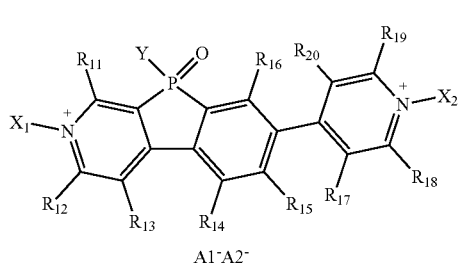

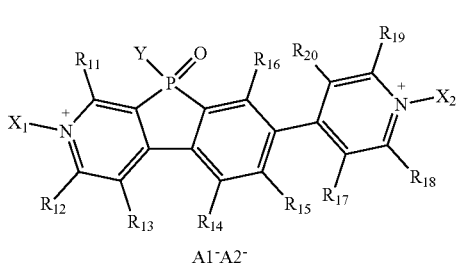

[1]

In the formula, each of $X_1$ and $X_2$ is independently selected from an alkyl group optionally having a substituent, an aryl group optionally having a substituent, and an aralkyl group optionally having a substituent.

Each of $R_{11}$ to $R_{20}$ is independently selected from a hydrogen atom, a halogen atom, and a substituent. The substituent is any one of an alkyl group optionally having a substituent, an alkoxy group optionally having a substituent, an aryl group optionally having a substituent, and a heterocyclic group optionally having a substituent.

Y represents an alkyl group optionally having a substituent or an aryl group optionally having a substituent.

Further features of the present disclosure will become apparent from the following description of exemplary embodiments with reference to the attached drawings.

DESCRIPTION OF THE EMBODIMENTS

Figure 1:
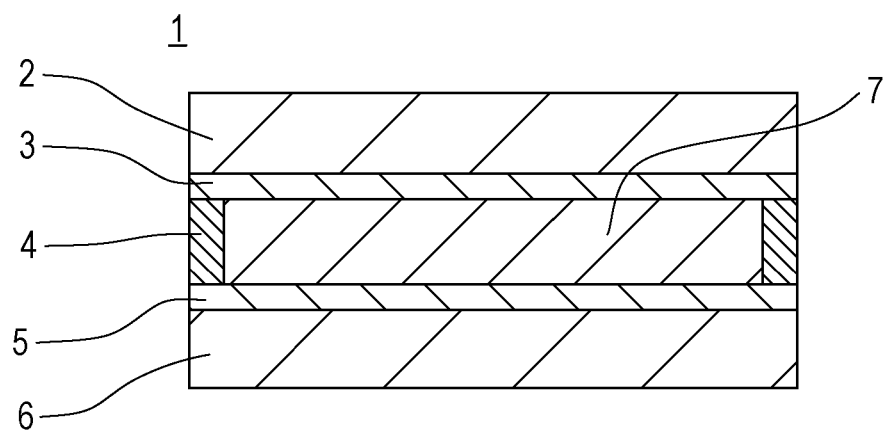
FIG. 1 is a schematic sectional view illustrating an example of the electrochromic device according to an embodiment.

An embodiment of the present disclosure relates to an organic compound that has electrochromic characteristics and that is denoted by general formula [1].

In general formula [1], each of $X_1$ and $X_2$ is independently selected from an alkyl group optionally having a substituent, an aryl group optionally having a substituent, and an aralkyl group optionally having a substituent.

Each of $X_1$ and $X_2$ is preferably an alkyl group. The alkyl group may be an alkyl group having a carbon atom number of 1 or more and 20 or less. A terminal of the alkyl group may be an adsorption group or an acid ester thereof. Having an adsorption group enables fixation to a porous electrode to be performed.

Specific examples of the alkyl group include carboxy groups, carboxylic ester groups, sulfonic acid groups, sulfonic acid ester groups, phosphonic acid groups, phosphonic acid ester groups, and trialkoxysilyl groups.

Regarding each of $X_1$ and $X_2$ that is an alkyl group, the terminal of the alkyl group may have a polar group, for example, a hydroxy group or an amino group, or an ionic group, for example, ammonium, pyridinium, or quinolinium, so as to improve solubility into an organic solvent.

In the case in which each of $X_1$ and $X_2$ is an aryl group, the aryl group is preferably a phenyl group. The phenyl group may have an alkyl group having a carbon atom number of 1 or more and 8 or less.

Each of $R_{11}$ to $R_{20}$ is independently selected from a hydrogen atom, a halogen atom, and a substituent. The substituent is any one of an alkyl group optionally having a substituent, an alkoxy group optionally having a substituent, an aryl group optionally having a substituent, and a heterocyclic group optionally having a substituent.

All $R_{11}$ to $R_{20}$ may be a hydrogen atom. At least one of $R_{17}$ to $R_{20}$ may have a halogen atom or a substituent. The substituent may be an alkyl group or an alkoxy group. The alkyl group and the alkoxy group may have a carbon atom number of 1 or more and 4 or less.

Y represents an alkyl group optionally having a substituent or an aryl group optionally having a substituent. Y is preferably the aryl group and, in particular, preferably a phenyl group. This is because the compound in which Y is an aryl group has higher stability than the compound in which Y is an alkyl group, is more bulky so as to readily become a steric hindrance group, and has a higher effect of suppressing association of molecules with each other.

The electrochromic compound according to the present embodiment may be present in a pair with an anion. An anion may be represented by $A_1^-$ or $A_2^-$. Each of $A_1^-$ and $A_2^-$ independently represents a monovalent anion.

Anions $A_1^-$ and $A_2^-$ may be the same or different from each other and are selected from negative ions, for example, $PF_6^-$, $ClO_4^-$, $BF_4^-$, $AsF_6^-$, $SbF_6^-$, $CF_3SO_3^-$, and $(CF_3SO_2)_2N^-$, and negative halogen ions, for example, $Br^-$, $Cl^-$, and $I^-$. Each of $A_1^-$ and $A_2^-$ is preferably any one of $PF_6^-$, $ClO_4^-$, $BF_4^-$, $CF_3SO_3^-$, and $(CF_3SO_2)_2N^-$. More preferably, $A_1^-$ and $A_2^-$ are the same anion.

Examples of the halogen atom according to the present embodiment include fluorine, chlorine, bromine, and iodine.

The carbon atom number of the alkyl group according to the present embodiment is preferably 1 or more and 20 or less. The carbon atom number is more preferably 1 or more and 8 or less. The alkyl group may be linear, branched, or cyclic. A hydrogen atom of the alkyl group may be replaced with a fluorine atom. That is, a methyl group may be a fluorinated methyl group. A carbon atom of the alkyl group may be replaced with an ester group or a cyano group.

Examples of the alkyl group include a methyl group, an ethyl group, a normal propyl group, an isopropyl group, a normal butyl group, a tertiary butyl group, an octyl group, a cyclohexyl group, and a trifluoromethyl group.

The carbon atom number of the alkoxy group according to the present embodiment is preferably 1 or more and 20 or less. The carbon atom number is more preferably 1 or more and 8 or less. The alkoxy group may be linear, branched, or cyclic. A hydrogen atom of the alkoxy group may be replaced with a halogen atom.

Specific examples of the alkoxy group include a methoxy group, an ethoxy group, an isopropoxy group, a n-butoxy group, a tert-butoxy group, an ethylhexyloxy group, an octyloxy group, a benzyloxy group, and a trifluoromethoxy group. In particular, the alkoxy group is preferably a methoxy group, an ethoxy group, and an isopropoxy group.

Examples of the aryl group according to the present embodiment include a phenyl group, a fluorenyl group, a naphthyl group, a fluoranthenyl group, an anthryl group, a phenanthryl group, a pyrenyl group, and a perylenyl group. The aryl group is preferably a phenyl group.

Examples of the heterocyclic group according to the present embodiment include a pyridyl group, a thienyl group, an oxazolyl group, an oxadiazolyl group, a thiazolyl group, a thiadiazolyl group, and an indolyl group. The heterocyclic group is preferably a pyridyl group. In this regard, the heterocyclic group may also be referred to as an aryl group having a hetero atom in a ring structure.

The aryl group and the heterocyclic group may have a halogen atom, an alkyl group having a carbon atom number of 1 or more and 20 or less, an alkoxy group having a carbon atom number of 1 or more and 20 or less, an aryl group, an aralkyl group, a hydroxy group, a substituted amino group, or a substituted silyl group as a substituent. The alkyl group and the alkoxy group may have a carbon atom number of 1 or more and 8 or less.

Examples of the aralkyl group according to the present embodiment include a benzyl group and a phenethyl group. The aralkyl group may have a substituent. Specifically, the aralkyl group may have an alkyl group having a carbon atom number of 1 or more and 20 or less or an alkoxy group having a carbon atom number of 1 or more and 20 or less. The alkyl group and the alkoxy group may have a carbon atom number of 1 or more and 8 or less.

There is no particular limitation regarding the method for manufacturing the organic compound according to the present embodiment, and the organic compound may be produced by, for example, a method described below. When each of $X_1$ and $X_2$ is the alkyl group or the aralkyl group, the organic compound denoted by general formula [1] above may be produced by the method described below. The organic compound denoted by general formula [1] may be produced by reacting an organic compound denoted by general formula [2] below with a halide in a predetermined solvent and, thereafter, performing an anion exchange reaction with a salt containing a desired anion in a predetermined solvent.

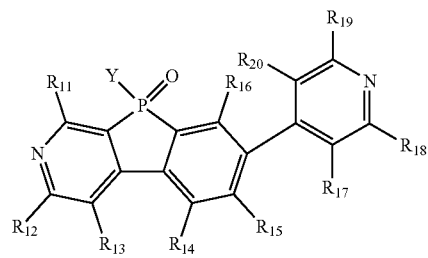

[2]

Meanwhile, when each of $X_1$ and $X_2$ is the aryl group, an intermediate in which each of $X_1$ and $X_2$ is a 2,4-dinitrophenyl group is synthesized by reacting the organic compound denoted by general formula [2] with 2,4-dinitrophenyl halide. After the intermediate is synthesized, the organic compound may be obtained by subjecting the resulting intermediate to a reaction with an aryl amine and to an anion exchange reaction with a salt containing an anion in a predetermined solvent. It is possible that an imine on only one side is reacted by selecting the solvent and the reaction temperature. It is also possible that two imines are provided with substituents different from each other by repeating the reaction.

There is no particular limitation regarding the manufacturing method of the organic compound denoted by general formula [2] above, and, for example, production may be performed by the manufacturing method described below.

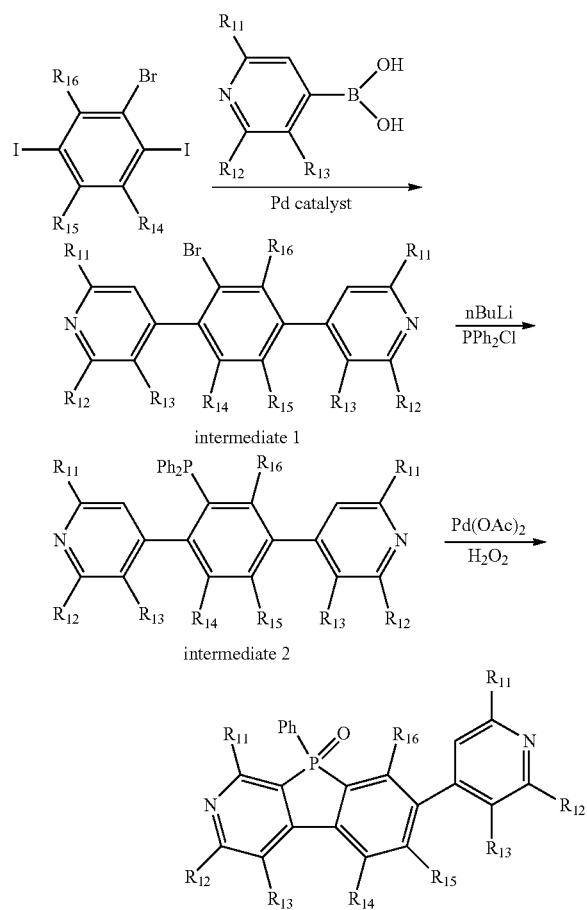

Intermediate 1 may be synthesized by a coupling reaction between a 2-bromo-1,4-diiodobenzene derivative and a 4-pyridylboronic acid derivative in the presence of a Pd catalyst. Intermediate 2 may be synthesized by subjecting intermediate 1 to a lithium-halogen exchange and PPh2-introducing reaction. The compound denoted by general formula [2] is synthesized by subjecting intermediate 2 to a C—H bond activation reaction and an oxidation reaction. In the above-described example of the manufacturing method, $R_{17}$ to $R_{19}$ are the same as $R_{11}$ to $R_{13}$, respectively, and Y is a phenyl group. Various compounds denoted by general formula [2] are synthesized by appropriately selecting a 4-pyridylboronic acid derivative in the synthesis of intermediate 1 and a PPh2-introducing reaction substrate in the synthesis of intermediate 2.

Next, characteristics based on the structure of the organic compound according to the present disclosure will be described. A viologen-based compound that is a representative example of the organic low-molecular-weight cathodic EC compound has absorption in wavelength ranges in the vicinity of 400 nm and in the vicinity of 600 nm in a reduction-colored state. Viologen is denoted by the chemical structure of a 4,4'-bipyridinium salt.

One technique for shifting the absorption wavelength range of the viologen-based compound in a colored state to a longer wavelength range is to extend the conjugate structure of the bipyridinium salt skeleton that serves as an EC portion, as described in Patent Literature 1 and Patent Literature 2. Patent Literature 1 discloses an organic compound in which three aromatic rings composed of two pyridine rings and a benzene ring serve as the EC portion, and Patent Literature 2 discloses an organic compound in which three aromatic rings composed of three pyridine rings serve as the EC portion. These compounds have absorption in the vicinity of 500 nm in a reduction-colored state. This absorption corresponds to the absorption in the vicinity of 400 nm of viologen shifted to a longer wavelength range because of electronic energy transition due to extending of the conjugate structure.

However, the coloring absorption spectra of the compounds described in Patent Literature 1 and Patent Literature 2 change in accordance with a temperature change. This is because radical cation species, which are reduction-colored bodies of the organic compound, are in an equilibrium state of monomers and associates. That is, a mixture is formed by monomers and associates. Regarding the equilibrium state, the presence ratio of monomers to associates in the mixture changes in accordance with the temperature. The absorption spectrum of monomers is different from the absorption spectrum of associates. As a result, the absorption spectrum of the mixture of monomers and associates changes in accordance with the temperature.

On the other hand, the organic compound denoted by general formula [1] according to the present disclosure has a bulky structure in the EC portion composed of three aromatic rings and, therefore, formation of associates is reduced in a reduction-colored state. As a result, the absorption spectrum is composed of only the spectrum of monomers in a reduction-colored state, and a change of absorption spectrum is small relative to a change of temperature.

Meanwhile, compound C-3 having the following structure is known as a viologen-based compound having high stability.

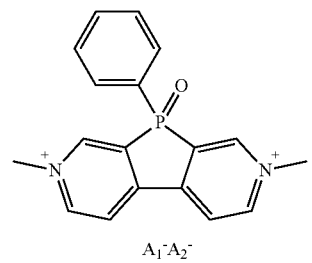

C-3

Organic compound C-3 is an EC compound in which the EC portion is composed of two pyridine rings. Therefore, the wavelength ranges of reduction-coloring absorption are the vicinity of 400 nm and the vicinity of 600 nm, which are equivalent to those of viologen, and are different from the vicinity of 500 nm which is reduction-coloring absorption of the compound according to the present disclosure.

The compound according to the present disclosure has higher oscillator strength than organic compound C-3. The oscillator strength corresponds to the strength of light absorption and is proportionate to the integral of the molar absorption coefficient. When an absorption spectrum has good symmetry, the oscillator strength is proportionate to the product of absorbance and half-value width at the maximum absorption wavelength. This corresponds to that the compound according to the present disclosure has higher absorbance than compound C-3. High absorbance has advantages that when the amount of use is the same, a higher optical density is provided, and when a certain optical density is provided, a smaller amount of use is required.

As an example of comparison between the oscillator strengths, regarding compound C-3 and compound C-4 having the following structure according to the present disclosure, molecular orbital calculations were performed.

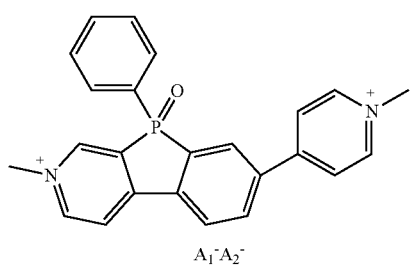

C-4

The results are shown in Table 1 below.

TABLE 1

| Compound No. | Oscillator strength |
|---|---|
| C-3 | 0.2984 |
| C-4 | 0.5496 |

As shown in Table 1, it was found that the oscillator strength of compound C-4 was about 1.84 times the oscillator strength of compound C-3. Therefore, it was supported that high absorbance was obtained with the structural characteristics.

In this regard, the three-dimensional structure illustrated in FIG. 1 was obtained on the basis of a structural optimization calculation in the ground state performed by using Gaussian 03*Revision D.01 that is electronic state calculation software. At this time, the density functional theory was adopted as a quantum chemical calculation method, and B3LYP was used as a functional. Regarding the base function, 6-31G* was used in Gaussian 03, Revision D.01.

The program used in performing the present calculation was Gaussian 09, Revision D.01 (M. J. Frisch, G. W. Trucks, H. B. Schlegel, G. E. Scuseria, M. A. Robb, J. R. Cheeseman, G. SCALMANI, V. Barone, B. Mennucci, G. A. Petersson, H. Nakatsuji, M. Caricato, X. Li, H. P. Hratchian, A. F. Izmaylov, J. Bloino, G. Zheng, J. L. Sonnenberg, M. Hada, M. Ehara, K. Toyota, R. Fukuda, J. Hasegawa, M. Ishida, T. Nakajima, Y. Honda, O. Kitao, H. Nakai, T. Vreven, J. A. Montgomery, Jr., J. E. Peralta, E Ogliaro, M. Bearpark, J. J. Heyd, E. Brothers, K. N. Kudin, V. N. Staroverov, T. Keith, R. Kpbayashi, J. Normand, K. Raghavachari, A. Rendell, J. C. Burant, S. S. Iyengar, J. Tomasi, M. Cossi, N. Rega, J. M. Millam, M. Klene, J. E. Knox, J. B. Cross, V. Bakken, C. Adamo, J. Jaramillo, R. Gomperts, R. E. Stratmann, O. Yazyev, A. J. Austin, R. Cammi, C. Pomelli, J. W. Ochterski, R. L. Martin, K. Morokuma, V. G. Zakrzewski, G. A. Voth, P. Salvador, J. J. Dannenberg, S. Dapprich, A. D. Daniels, O. Farkas, J. B. Foresman, J. V. Ortiz, J. Cioslowski, and D. J. Fox, Gaussian, Inc., Wallingford Conn., 2013).

Specific examples of structural formula of the organic compound according to the present disclosure will be described below. However, the compound according to the present invention is not limited to these.

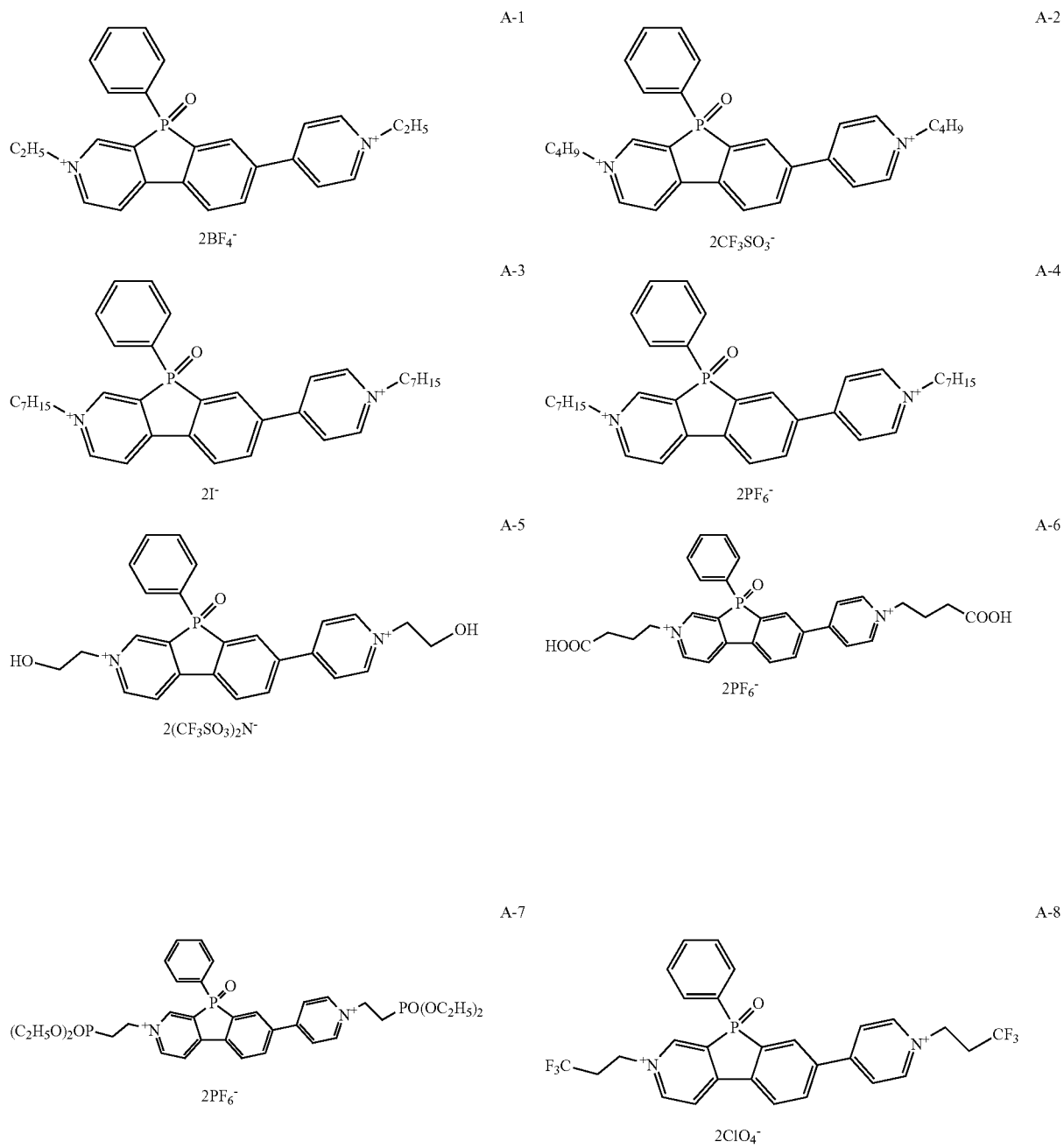

-continued
A-9
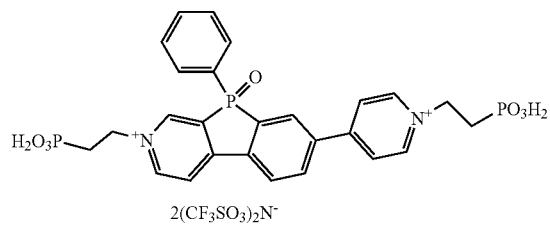
A-10
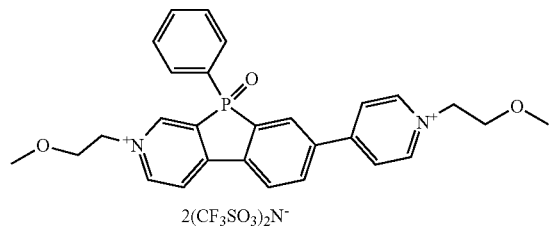
A-11
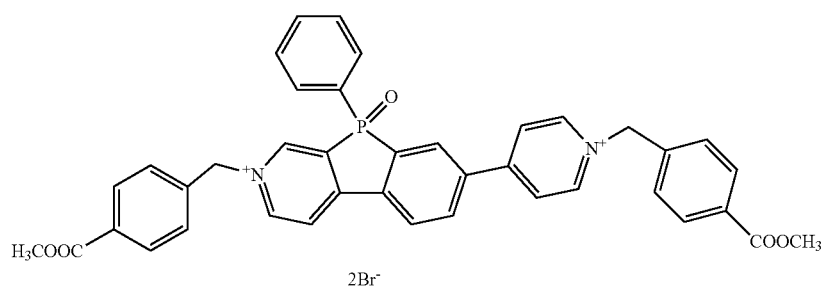
A-12
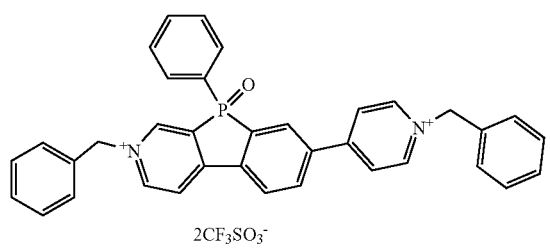
A-13
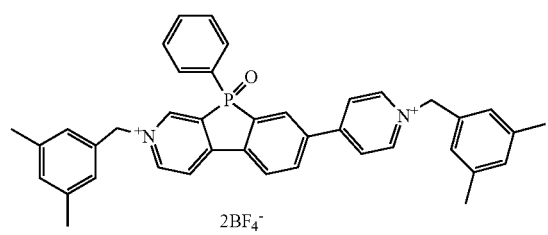
A-14
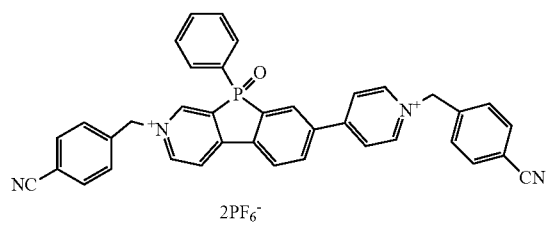
A-15
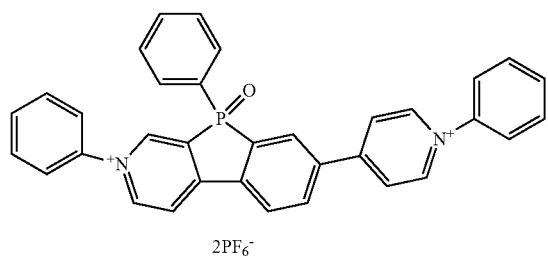
A-16
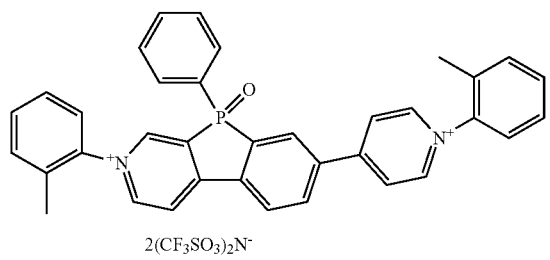
A-17
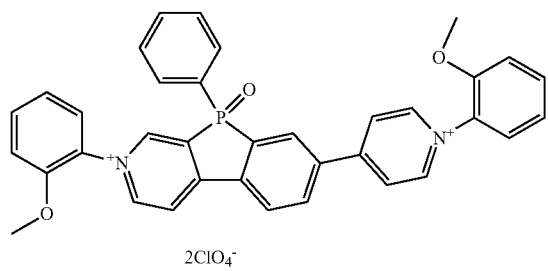

-continued
A-18
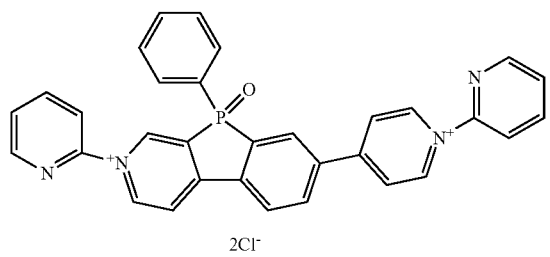
2Cl⁻
A-19
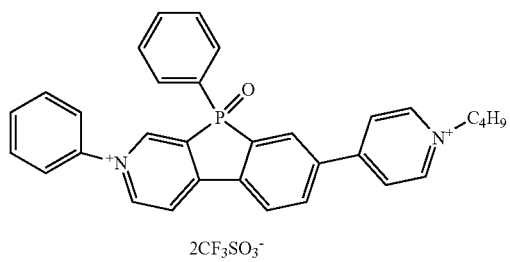
2CF₃SO₃⁻
A-20
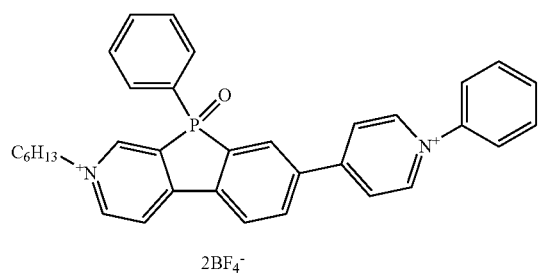
2BF₄⁻
A-21
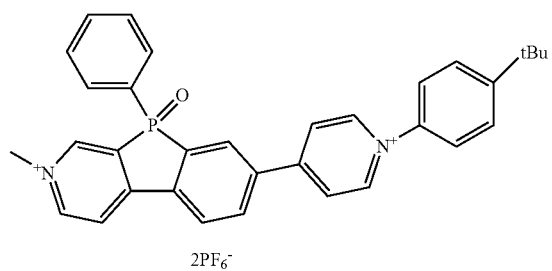
2PF₆⁻
A-22
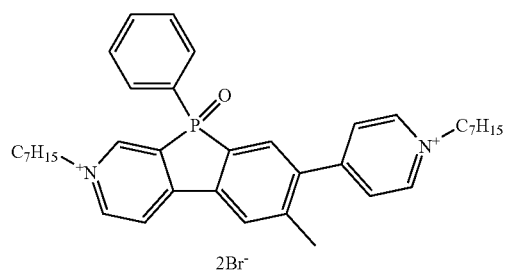
2Br⁻
A-23
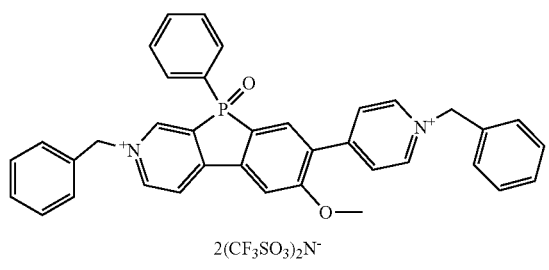
2(CF₃SO₃)₂N⁻
A-24
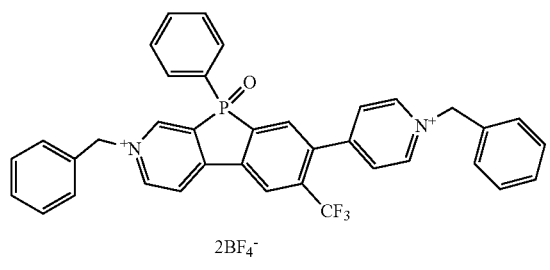
2BF₄⁻
A-25
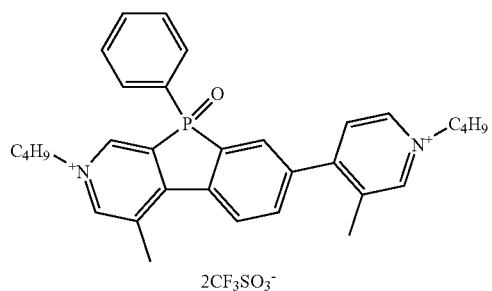
2CF₃SO₃⁻
A-26
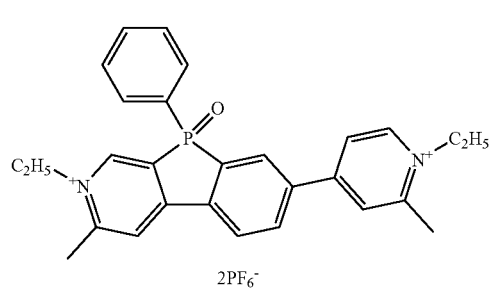
2PF₆⁻
B-1
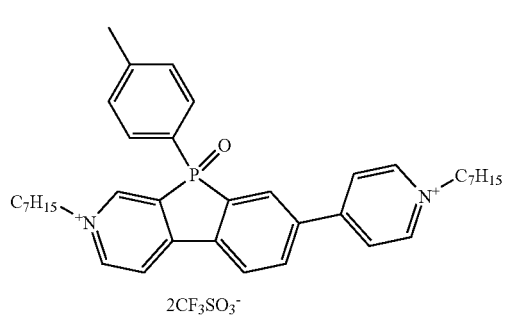
2CF₃SO₃⁻

-continued
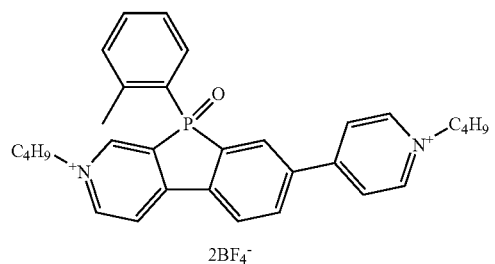
B-2
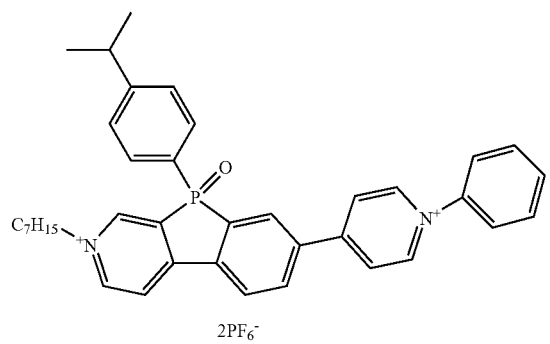
B-3
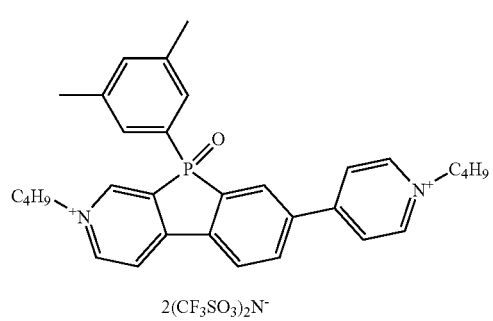
B-4
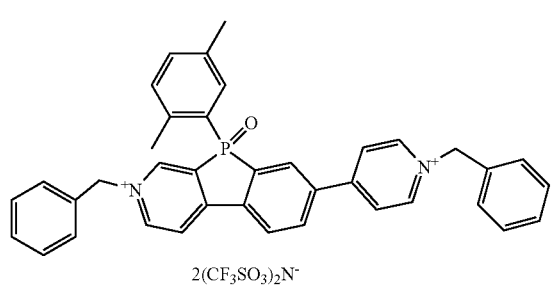
B-5
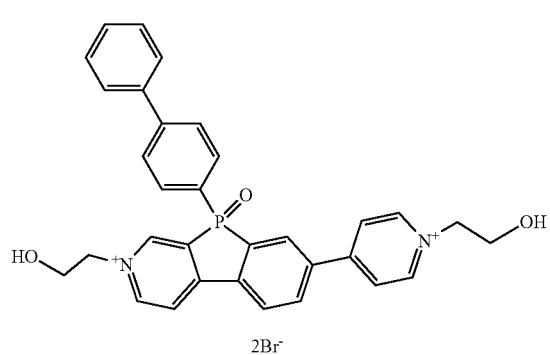
B-6
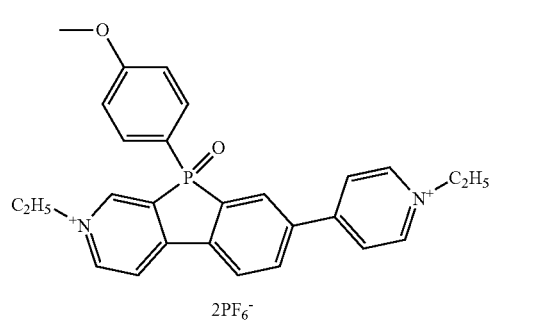
B-7
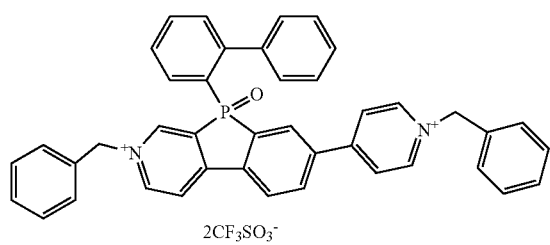
B-8
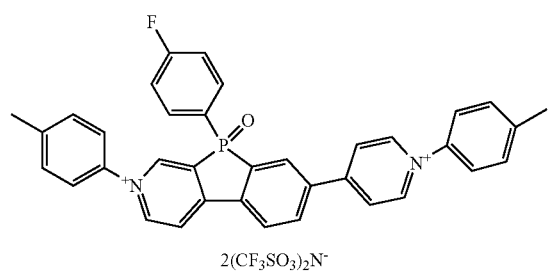
B-9
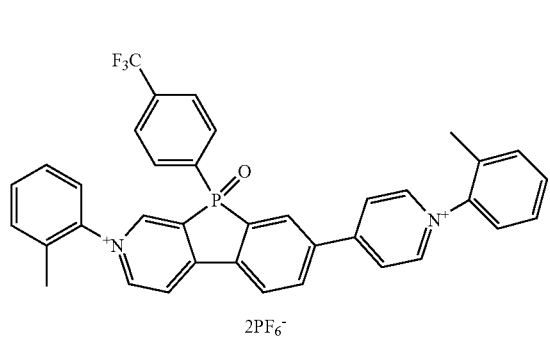
B-10
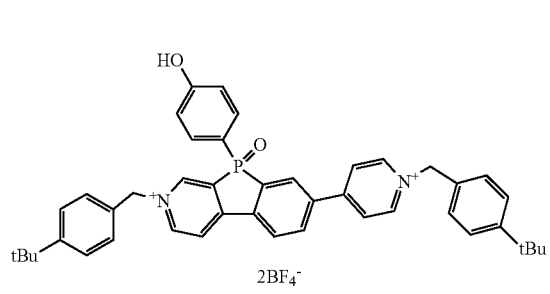
B-11

-continued

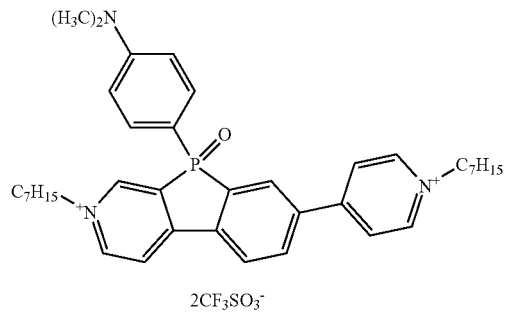
B-12

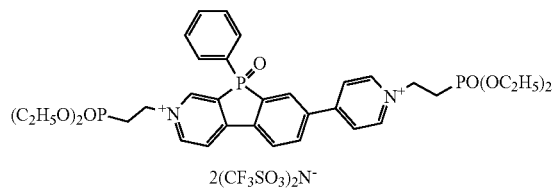
B-13

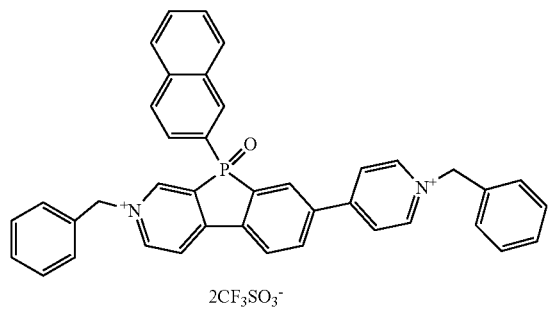
B-14

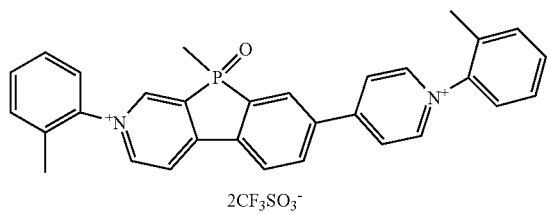
B-15

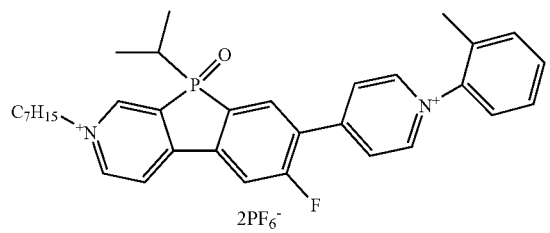
B-16

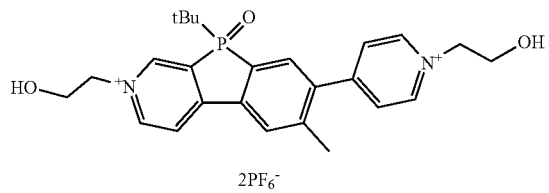
B-17

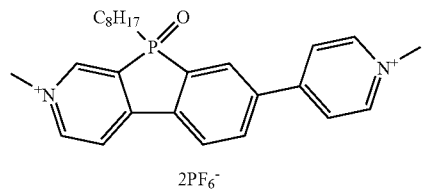
B-18

Of the exemplary compounds, organic compounds shown in group A have a structure in which the substituent represented by Y in general formula is a phenyl group.

Meanwhile, organic compounds shown in group B have a structure in which the substituent represented by Y in general formula is an aryl group having various substituents or an alkyl group.

The EC organic compound according to the present disclosure may be used as an EC layer of an electrochromic device.

The EC device according to the present embodiment will be described below with reference to the drawings.

The EC device 1 illustrated in FIG. 1 includes a pair of transparent electrodes 2 and 6, a pair of electrodes 3 and 5, and an EC layer 7 disposed between the pair of electrodes. The pair of electrodes has a constant distance between electrodes because of a spacer 4.

The EC layer contains the organic compound according to the present disclosure. The EC layer may include a layer composed of an EC compound and a layer composed of an electrolyte. The EC layer may be disposed as a solution containing the EC compound and an electrolyte. This form may be explained such that the EC layer is a solution layer. In the EC device according to the present embodiment, the EC layer is preferably a solution layer. In the case in which the EC layer is a solution layer, the EC organic compound, the solution, and other dissolved materials may be collectively referred to as an EC medium.

Next, members that constitute the EC device according to the present embodiment will be described.

There is no particular limitation regarding the electrolyte as long as the electrolyte is an ionic dissociative salt and exhibits good solubility in a solvent or high compatibility with respect to solid electrolyte. In particular, the electrolyte having electron-donating ability is preferred. Such an electrolyte may be referred to as a supporting electrolyte.

Examples of the electrolyte include inorganic ion salts, for example, various alkali metal salts, and alkaline earth metal salts, quaternary ammonium salts, and cyclic quaternary ammonium salts.

Specific examples include alkali metal salts, for example, $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, and $KCl$, quaternary ammonium salts, for example, $(CH_3)_4NBF_4$, $(C_2H_5)_4\ NBF_4$, $(n\text{-}C_4H_9)_4NBF_4$, $(n\text{-}C_4H_9)_4NPF_6$, $(C_2H_5)_4NBr$, $(C_2H_5)_4NClO_4$, and $(n\text{-}C_4H_9)_4NClO_4$, and cyclic quaternary ammonium salts.

There is no particular limitation regarding the solvent that dissolves the EC organic compound and the electrolyte as long as the EC organic compound and the electrolyte are dissolved. In particular, solvents having polarity are preferred.

Specific examples include water and organic polar solvents, for example, methanol, ethanol, propylene carbonate, ethylene carbonate, dimethylsulfoxide, dimethoxyethane, γ-butyrolactone, γ-valerolactone, sulfolane, dimethylformamide, dimethoxyethane, tetrahydrofuran, acetonitrile, propionitrile, 3-methoxypropionitrile, benzonitrile, dimethylacetamide, methylpyrrolidinone, and dioxolane. These may be used alone, or at least two types may be used in combination.

Further, the above-described EC medium may be used after, for example, being mixed with a polymer or a gelatinizer so as to become highly viscous or gelatinous. The polymer or the gelatinizer may be referred to as a thickener. When the viscosity of the EC solution is increased by adding the thickener, the organic compound does not readily form associates, and the temperature dependency of the absorption spectrum is reduced. Therefore, the EC solution preferably includes a thickener.

The viscosity of the EC solution may be 10 to 5,000 cP, or may be 50 to 1,000 cP. The viscosity of the EC solution may be 150 cP or less, preferably 100 cP or less, and more preferably 65 cP or less. Meanwhile, the viscosity of the EC solution may be 20 cP or more and preferably 50 cP or more.

The weight ratio of the thickener may be 20% by weight or less where the weight of the above-described electrochromic layer is assumed to be 100% by weight. The weight ratio is preferably 1% by weight or more and 15% by weight or less and more preferably 5% by weight or more and 10% by weight or less.

There is no particular limitation regarding the above-described polymer, and examples include polyacrylonitriles, carboxymethyl celluloses, polyvinyl chlorides, polyalkylene oxides, polyurethanes, polyacrylates, polymethacrylates, polyamides, polyacrylamides, polyesters, and Nafion (registered trademark). Polymethylmethacrylates, polyethylene oxides, and propylene oxides are preferred.

When the EC solution has high viscosity, movement of molecules in the EC solution is suppressed and, thereby, association may be suppressed. Meanwhile, movement of electrons in the EC solution is suppressed, and the response speed of the EC device is suppressed. Therefore, an excessive increase in viscosity is not preferred.

Next, the transparent substrate and the transparent electrode will be described. Regarding the transparent substrate, colorless or colored glass, tempered glass, and the like are used. In addition, colorless or colored transparent resins are used. In the present embodiment, "transparent" indicates that the visible light transmittance is 70% or more.

Specific examples include polyethylene terephthalates, polyethylene naphthalates, polynorbornenes, polyamides, polysulfones, polyether sulfones, polyether ether ketones, polyphenylene sulfides, polycarbonates, polyimides, and polymethyl methacrylates.

Examples of the electrode material include metals and metal oxides, for example, an indium tin oxide alloy (ITO), fluorine-doped tin oxide (FTO), tin oxide (NESA), indium zinc oxide (IZO), silver oxide, vanadium oxide, molybdenum oxide, gold, silver, platinum, copper, indium, and chromium, silicon-based materials, for example, polysilicon and amorphous silicon, and carbon materials, for example, carbon black, graphite, and glassy carbon.

In addition, conductive polymers having electrical conductivity improved by doping treatment or the like, for example, polyanilines, polypyrroles, polythiophenes, polyacetylenes, polyparaphenylenes, and complexes of polyethylenedioxythiophene (PEDOT) and polystyrenesulfonic acid are used suitably.

To hold the EC layer between the pair of electrodes and to maintain the distance between the two electrodes, a sealant is suitably used. The sealant may have a function of maintaining the distance between the electrodes by, for example, containing a spacer material. The sealant is disposed between the pair of electrodes and provides a space to store a solution containing the EC organic compound according to the present disclosure. This sealant is preferably a material that is chemically stable, that does not readily pass gas and liquid, and that does not hinder an oxidation-reduction reaction of the EC compound. Specifically, inorganic materials, for example, glass frit, thermosetting materials or photo-curable materials, for example, epoxy-based resins and acrylic resins, polyimides, polytetrafluoroethylenes, and fluororubbers may be used.

The EC device according to the present embodiment may include a liquid injection hole formed by the pair of electrodes and a spacer. After a composition containing the EC organic compound is introduced through the liquid injection hole, the injection hole is covered with a sealing member, and hermetical sealing is performed by an adhesive or the like so as to form the device. The sealing member also functions as a member to isolate the adhesive from the EC organic compound so as not to be in contact with each other.

There is no particular limitation regarding the method for forming the EC device according to the present embodiment, and a method in which a liquid containing the EC organic compound prepared in advance is injected into a gap located between a pair of electrodes by a vacuum injection method, an air injection method, a meniscus method, or the like may be used.

The EC device according to the present embodiment may contain the organic compound according to the present embodiment and a second organic compound of a type different from the organic compound of the present embodiment. The second organic compound may be one type or a plurality of types and may be an anodic EC compound that is colored in an oxidation state, a cathodic EC compound that is colored in a reduction state, or a compound having both properties. The organic compound according to the present disclosure is a compound that is colored in a reduction state and, therefore, the second organic compound is preferably an anodic EC compound that is colored in an oxidation state.

The anodic EC compound that is colored in an oxidation state is a compound having a visible light transmittance in an oxidation state lower than the visible light transmittance in a reduction state. A transmittance in the visible light range has to change, and it is not necessary that the transmittance in the entire visible light range changes.

The second organic compound preferably constitutes black absorption in combination with the absorption spectrum of the organic compound denoted by general formula [1] according to the present embodiment.

In addition to the second organic compound, a third organic compound may be contained. When the third organic compound having coloring absorption in a wavelength range different from the organic compound according to the present disclosure and the second organic compound is provided, light absorption of the EC device is widely controlled. The third organic compound may be an anodic EC compound or a cathodic EC compound.

The absorption wavelength range in a decolorized state of the other EC compound is preferably 400 nm or less. This is because a device having high transparency in a decolorized state is provided. On the other hand, the absorption wavelength range in a colored state is preferably within the range of 400 nm or more and 800 nm or less, and more preferably 400 nm or more and 450 nm or less, or 600 nm or more and 700 nm or less.

An EC compound that evenly absorbs light at each wavelength in the visible light range is preferably formed by containing the other EC compound.

The EC device according to the present embodiment preferably contains at least five types of EC compounds including the organic compound according to the present disclosure. This is because a filter including the EC device readily evenly absorbs light at each wavelength.

Examples of the other EC compound according to the present embodiment include the following compounds.

Examples of the other EC compound that is colored in an oxidation state include oligothiophene-based compounds, phenazine-based compounds, for example, 5,10-dihydro-5,10-dimethylphenazine and 5,10-dihydro-5,10-diisopropylphenazine, metallocene-based compounds, for example, ferrocene, tetra-t-butylferrocene, and titanocene, phenylenediamine-based compounds, for example, N,N',N,N'-tetramethyl-p-phenylenediamine, and pyrazoline-based compounds, for example, 1-phenyl-2-pyrazoline.

Examples of the compound that is colored in a reduction state include viologen-based compounds, for example, N,N'-diheptylbipyridinium diperchlorate, N,N'-diheptylbipyridinium ditetrafluoroborate, N,N'-diheptylbipyridinium dihexafluorophosphate, N,N'-diethylbipyridinium diperchlorate, N,N'-diethylbipyridinium ditetrafluoroborate, N,N'-diethylbipyridinium dihexafluorophosphate, N,N'-dibenzylbipyridinium diperchlorate, N,N'-dibenzylbipyridinium ditetrafluoroborate, N,N'-dibenzylbipyridinium dihexafluorophosphate, N,N'-diphenylbipyridinium diperchlorate, N,N'-diphenylbipyridinium ditetrafluoroborate, and N,N'-diphenylbipyridinium dihexafluorophosphate, anthraquinone-based compounds, for example, 2-ethylanthraquinone, 2-t-butylanthraquinone, and octamethylanthraquinone, ferrocenium-salt-based compounds, for example, ferrocenium tetrafluoroborate and ferrocenium hexafluorophosphate, and styrylation-based compounds.

In the present embodiment, the phenazine-based compound refers to a compound having a 5,10-dihydrophenazine skeleton in the chemical structure. The phenazine-based compounds include a compound having a substituent in 5,10-dihydrophenazine. For example, hydrogen atoms at positions 5 and 10 of 5,10-dihydrophenazine may be substituted with an alkyl group, for example, a methyl group, an ethyl group, and a propyl group, or an aryl group, for example, a phenyl group. The phenazine-based compound may be a compound including an alkyl group having a carbon atom number of 1 or more and 20 or less in 5,10-dihydrophenazine, an alkoxy group having a carbon atom number of 1 or more and 20 or less in 5,10-dihydrophenazine, or an aryl group having a carbon atom number of 4 or more and 60 or less in 5,10-dihydrophenazine. The same applies to other compounds, for example, viologen-based compounds.

The compound contained in the EC layer included in the EC device may be extracted and analyzed by a known method and, thereby, the presence of the compound in the EC device may be verified. For example, extraction is performed by chromatography and analysis is performed by NMR. In the case in which the electrochromic layer is solid, analysis is performed by TOF-SIMS or the like.

The EC device according to the present embodiment has high transparency in a decolorized state, enables a high optical density to be realized in a colored state so as to reduce the transmittance and, as a result, is suitable for use to greatly reduce the amount of light incident on an image pickup device, for example, a camera.

The EC device according to the present embodiment may be used for optical filters, lens units, image pickup apparatuses, window members, and the like. The EC device may be used for electrochromic mirrors by including a light reflecting member in any one of light transmitting directions. The light reflecting member may also serves as an electrode or a substrate.

The optical filter according to the present embodiment includes an EC device 1 and an active device connected to the EC device 1. The active device drives an electrochromic device and adjusts the amount of light that passes through the electrochromic device. Examples of the active device include transistors. The transistor may include oxide semiconductors, for example, InGaZnO, in the active region.

Figure 2:
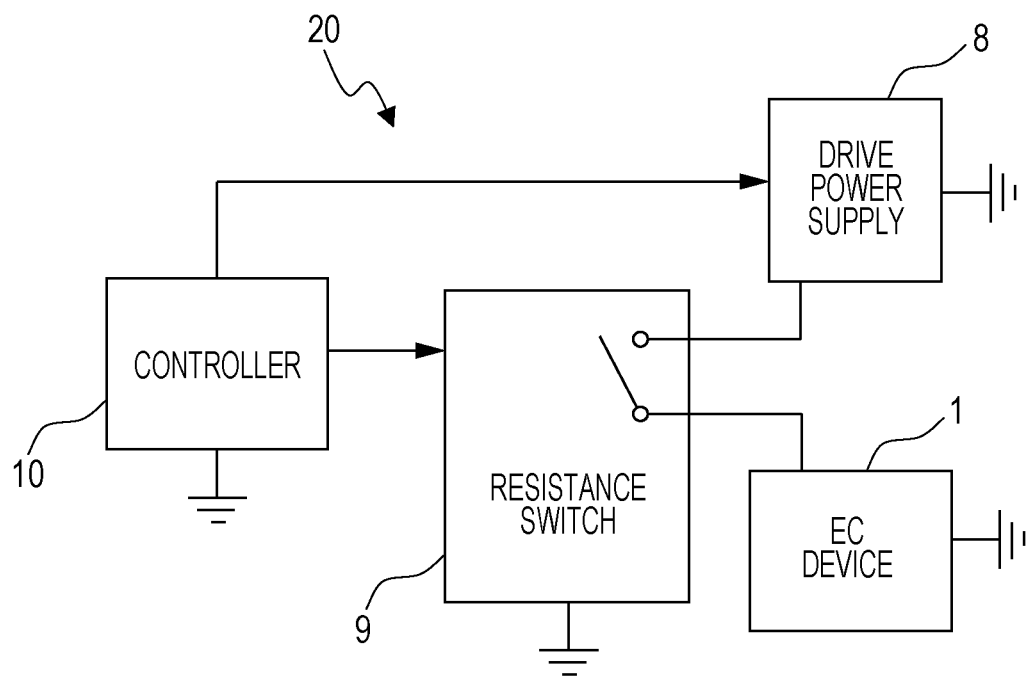
FIG. 2 is a schematic diagram illustrating an example of a drive apparatus connected to an electrochromic device according to an embodiment.

The optical filter includes the EC device 1 according to the present embodiment and a drive apparatus connected to the EC device 1. FIG. 2 is a schematic diagram illustrating an example of a drive apparatus 20 for the EC device 1 and the EC device 1 driven by the drive apparatus 20. The drive apparatus 20 for the EC device 1 according to the present embodiment includes a drive power supply 8, a resistance switch 9, and a controller 10.

The drive power supply 8 applies, to the EC device 1, a voltage required of the EC material contained in an EC layer 12 for performing an electrochemical reaction.

Regarding the method for controlling the transmittance of the EC device by the controller 10, a method suitable for the device used is adopted. Specifically, a method in which predetermined conditions in accordance with a desired set value of the transmittance are input into the EC device 1 and a method in which the set value of transmittance is compared with the transmittance of the EC device 1 and the condition is selected and input such that the set value is satisfied. Examples of parameters to be changed include a voltage, a current, and a duty ratio. The controller 10 enables the coloring density of the EC device to be changed by changing the voltage, the current, or the duty ratio.

In the present embodiment, known measures may be used for changing the voltage, changing the current, and modulating the pulse width. The pulse width may also be modulated as described below.

The resistance switch 9 incorporates, although not shown in the drawing, resistance R1 or resistance R2 higher than resistance R1 connected in series by switching, into a closed circuit including the drive power supply 8 and the EC device 1. The resistance value of resistance R1 is preferably lower than at least the highest impedance in the device closed circuit and is preferably 10 n or less. The resistance value of resistance R2 is preferably higher than the highest impedance in the device closed circuit and is preferably 1 MΩ or more. In this regard, resistance R2 may be air. In this case, the closed circuit is strictly an open circuit but is considered to be a closed circuit because the air is assumed to be resistance R2. The controller 10 sends a switching signal to the resistance switch 9 so as to control switching between resistance R1 and resistance R2.

The lens unit according to the present embodiment includes a plurality of lenses and an optical filter including the EC device 1. The optical filter may be disposed either between the plurality of lenses or outside the lenses. The optical filter is preferably disposed on the optical axis of the lenses.

The image pickup apparatus according to the present embodiment includes the optical filter and a light receiving device that receives light passing through the optical filter.

Specific examples of the image pickup apparatus include cameras, camcorders, and mobile phones with a camera. The image pickup apparatus may be in the form in which a main body including the light receiving device is separable from the lens unit including the lenses.

In the case in which the image pickup apparatus is separated into the main body and the lens unit, a form in which an optical filter separated from the image pickup apparatus is used during image pickup is also included in the present disclosure. In this case, examples of the location of the optical filter include outside the lens unit, between the lens unit and the light receiving device, and between a plurality of lenses (when the lens unit includes a plurality of lenses).

Figure 3A:
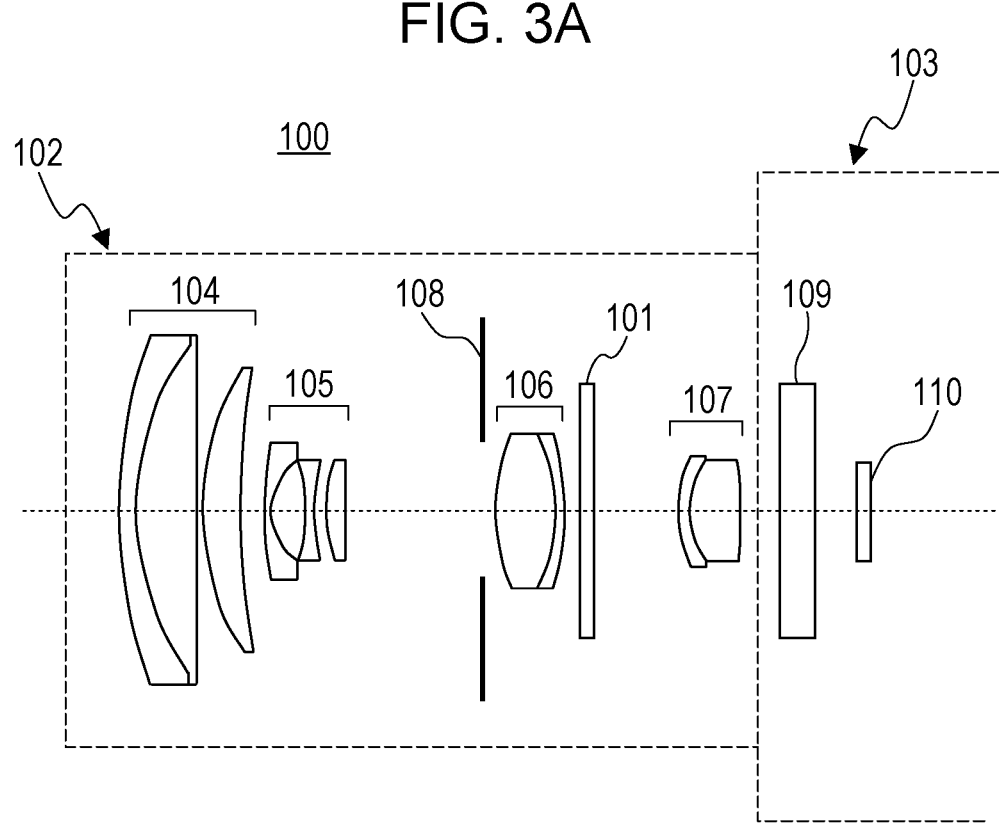
FIG. 3A is a schematic diagram illustrating an example of an image pickup apparatus in which an optical filter is disposed in a lens unit.
Figure 3B:
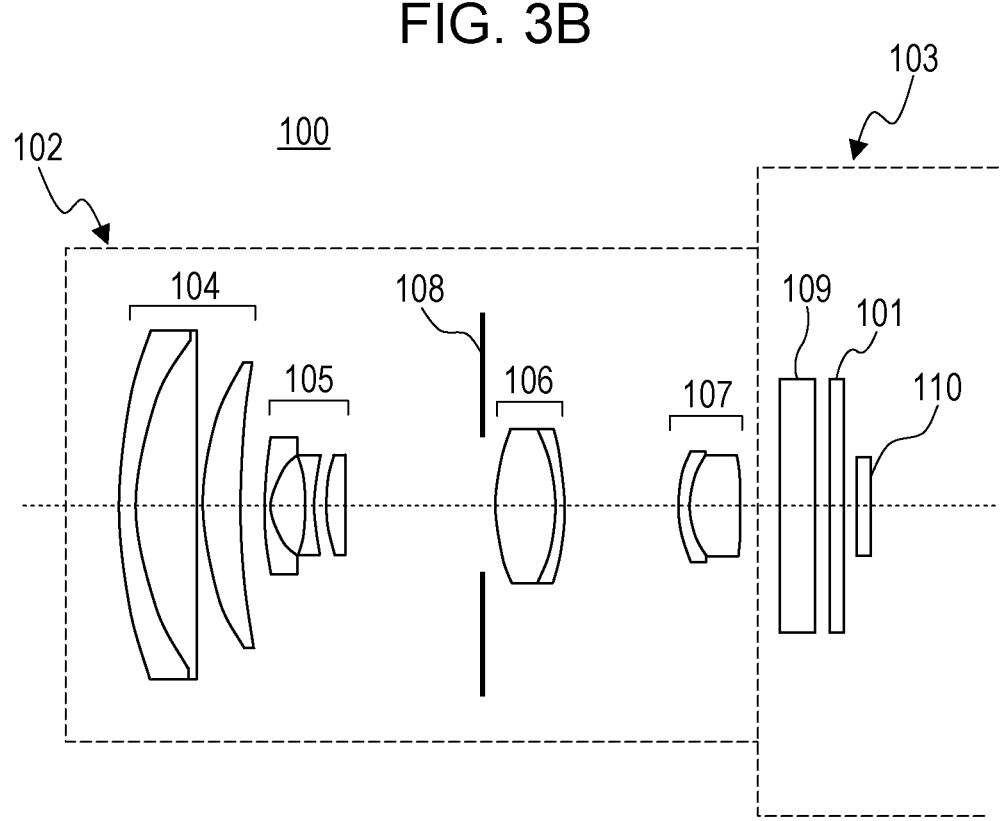
FIG. 3B is a schematic diagram illustrating an example of an image pickup apparatus in which an optical filter is disposed in an image pickup unit.

Each of FIGS. 3A and 3B is a schematic diagram illustrating an example of the configuration of an image pickup apparatus 100 in which the optical filter according to the present embodiment is used.

The image pickup apparatus 100 is an image pickup apparatus including a lens unit 102 and an image pickup unit 103.

The lens unit 102 includes an optical filter 101 and an image pickup optical system including a plurality of lenses or lens groups. The optical filter 101 is the above-described optical filter according to the present embodiment.

For example, in FIG. 3A, the lens unit 102 represents a rear focus type zoom lens in which focusing is performed following a diaphragm. Four lens groups, that is, a first lens group 104 having a positive refractive power, a second lens group 105 having a negative refractive power, a third lens group 106 having a positive refractive power, and a fourth lens group 107 having a positive refractive power, are included sequentially from an object. Zooming is performed by changing the distance between the second lens group 105 and the third lens group 106, and focusing is performed by moving some lenses of the fourth lens group 107.

The lens unit 102 includes an aperture diaphragm 108 between the second lens group 105 and the third lens group 106 and includes an optical filter 101 between the third lens group 106 and the fourth lens group 107. The lens unit 102 is disposed such that the light passing through the lens unit passes through each of lens groups 104 to 107, the diaphragm 108, and the optical filter 101 and, thereby, the amount of light is adjusted by using the aperture diaphragm 108 and the optical filter 101.

The lens unit 102 is detachably connected to the image pickup unit 103 with a mount member (not shown in the drawing) interposed therebetween.

In the present embodiment, the optical filter 101 is disposed between the third lens group 106 and the fourth lens group 107 in the lens unit 102. However, the image pickup apparatus 100 is not limited to this configuration. For example, the optical filter 101 may be disposed at either the front (object side) or the back (image pickup unit 103 side) of the aperture diaphragm 108 or disposed at either the front or the back of any one of the first lens group 104 to the fourth lens group 107 or between the lens groups. In this regard, if the optical filter 101 is disposed at the position on which the light converges, an advantage of, for example, decreasing the area of the optical filter 101 is obtained.

The configuration of the lens unit 102 is not limited to the above-described configuration and may be appropriately selected. For example, an inner focus system in which focusing is performed before diaphragm or systems other than the rear focus system may be adopted. Specific lenses, for example, fisheye lenses and microlenses, other than the zoom lens may be appropriately selected.

The image pickup unit 103 includes glass block 109 and a light receiving device 110.

The glass block 109 is a glass block such as a low-pass filter, a face plate, or a color filter.

The light receiving device 110 is a sensor portion that receives the light passing through the lens unit, and an image pickup device, for example, CCD and CMOS, may be used. In addition, those which acquire and output information on the intensity and wavelength of the light, for example, light sensors such as photodiodes, may be usable for the light receiving device.

FIG. 3A is a schematic diagram illustrating an example of an image pickup apparatus in which an optical filter is disposed in a lens unit. In the case in which the optical filter 101 is incorporated into the lens unit 102, as in FIG. 3A, a drive apparatus may be disposed in the lens unit 102 or disposed outside the lens unit 102. In the case in which the drive apparatus is disposed outside the lens unit 102, the EC device 1 in the lens unit 102 is connected to the drive apparatus through a conductive line, and drive control is performed.

In the above-described configuration of the image pickup apparatus 100, the optical filter 101 is disposed inside the lens unit 102. However, the present invention is not limited to this form, and the optical filter 101 may be disposed at an appropriate location inside the image pickup apparatus 100 as long as the light receiving device 110 is disposed so as to receive the light passing through the optical filter 101.

FIG. 3B is a schematic diagram illustrating an example of an image pickup apparatus in which an optical filter is disposed in an image pickup unit. The image pickup unit 103 includes the optical filter 101. In FIG. 3B, for example, the optical filter 101 is disposed immediately before the light receiving device 110. In the case in which the image pickup apparatus itself includes the optical filter 101, there is no need to include the optical filter 101 in the lens unit 102 to be connected. Therefore, a light modulating image pickup apparatus that includes an existing lens unit 102 may be constructed.

The image pickup apparatus 100 according to the present embodiment may be applied to products including a combination of adjustment of amount of light and a light receiving device. For example, application to cameras, digital cameras, camcorders, and digital camcorders may be performed, and application to products including an image pickup apparatus, for example, mobile phones, smart phones, PCs, and tablets, may be performed.

Figure 4A:
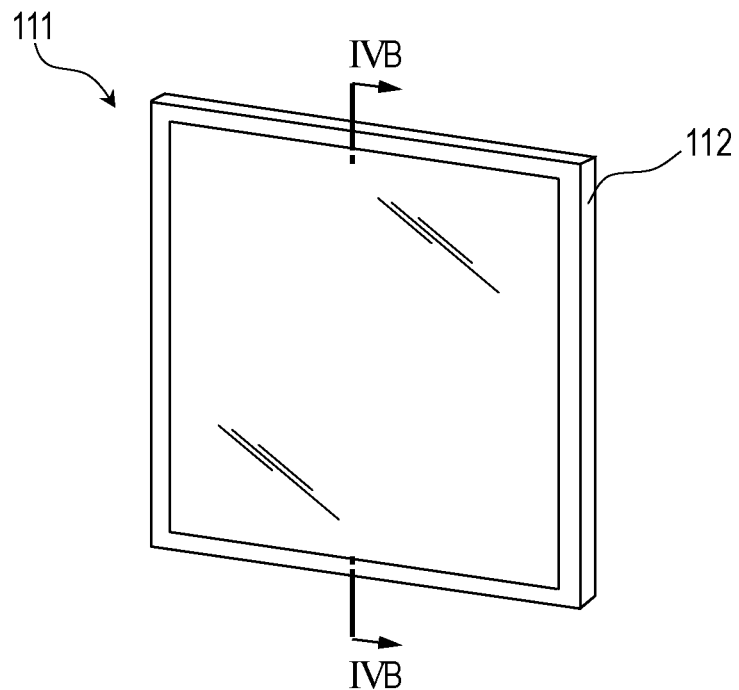
FIG. 4A is a schematic diagram of a window in which an EC device according to the present embodiment is used.
Figure 4B:
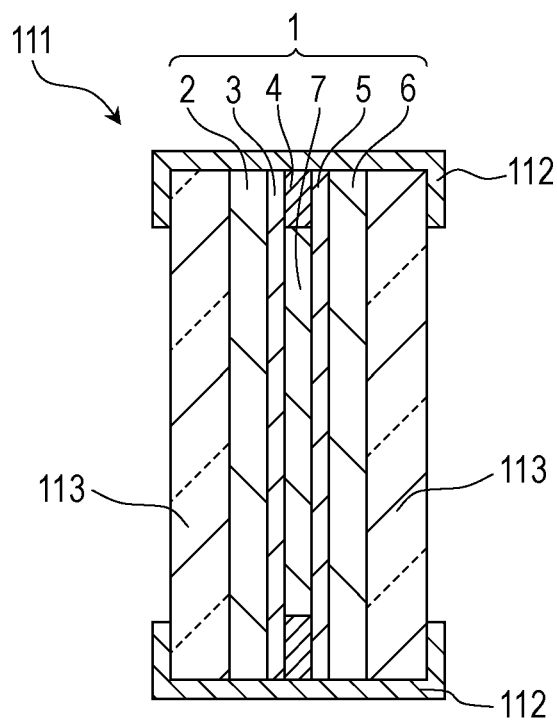
FIG. 4B is a schematic sectional view along line IVB-IVB in FIG. 4A.

The EC device 1 according to the present embodiment may be used as a window member. FIG. 4A is a schematic diagram of a window in which the EC device 1 according to the present embodiment is used. FIG. 4B is a schematic sectional view along line IVB-IVB in FIG. 4A.

A light modulating window 111 is composed of the EC device 1 (optical filter), transparent plates 113 holding the EC device 1, and a frame 112 to surround and integrate the entirety. The optical filter includes a drive apparatus, although not shown in the drawing. The drive apparatus may be disposed in the frame 112 so as to be integrated with the frame 112 or disposed outside the frame 112 so as to be connected to the EC device 1 through a conductive line.

There is no particular limitation regarding the transparent plate 113 as long as the material has high optical transmittance, and the material is preferably a glass raw material in consideration of use for a window.

There is no particular limitation regarding the material for forming the frame 112, and resins, for example, polycarbonates, acrylonitrile-butadiene-styrene, polyalkylene furan dicarboxylates, polylactic acids, and polybutadiene terephthalates or mixtures of these may be used.

The frame may refers to general materials having a form of covering at least part of the optical filter and being integrated.

In FIGS. 4A and 4B, the EC device 1 is a constituent member independent of the transparent plate 113. However, for example, the transparent substrate 10 of the EC device 1 may be assumed to be the transparent plate 113.

The above-described light modulating window may be applied to use to adjust the amount of solar light incident on a room during the daytime. The light modulating window may also be applied to adjustment of an amount of heat other than the amount of solar light and, therefore, may be used to control brightness and temperature in a room. Further, such a light modulating window may be used as a shutter to obstruct the view from outside to the room. Such a light modulating window may be applied to windows of moving bodies, for example, automobiles, electric trains, airplanes, and ships, other than glass windows for buildings.

As described above, the EC device 1 containing the organic compound denoted by general formula [1] in the EC layer 12 may be used for optical filters, lens units, image pickup apparatuses, windows, and the like. Each of the optical filter, the lens unit, the image pickup apparatus, and the window according to the present embodiment provides various absorption colors by using the organic compound denoted by general formula [1] alone or by using a combination of the organic compound denoted by general formula [1] and an EC compound having coloring absorption in another wavelength range.

According to the image pickup apparatus 100 of the present embodiment, if the optical filter 101 is used as a light modulating member, the amount of light modulated is able to be changed by one filter, and there are advantages in reducing the number of the members and saving spaces.

EXAMPLES

The present disclosure will be further specifically described below with reference to the examples. However, the present invention is not limited to these.

Example 1

Synthesis of Exemplary Compound A-3

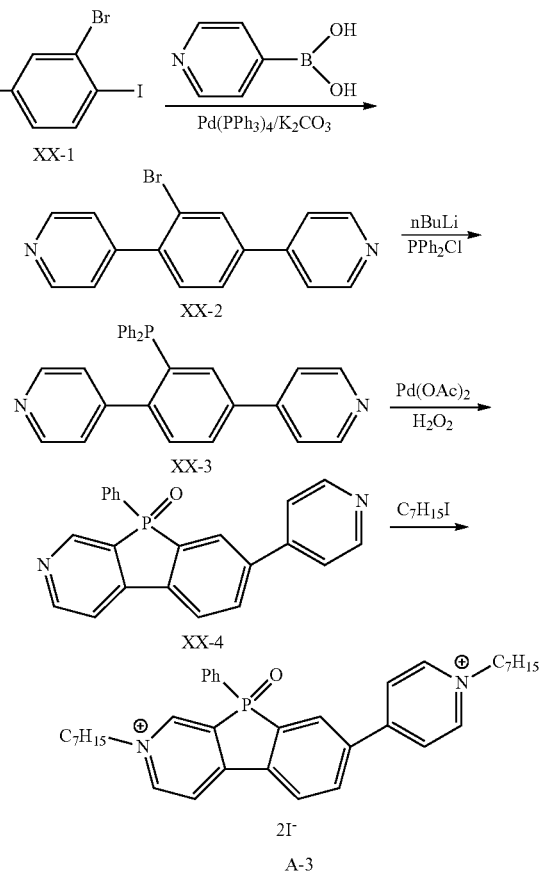

Synthesis of XX-2

In a 50-ml reaction container, 2.04 g (5 mmol) of XX-1 and 1.35 g (11 mmol) of 4-pyridylboronic acid were mixed in 1,4-dioxane (25 ml), and dissolved oxygen was removed by nitrogen.

Next, 288 mg (0.25 mmol) of Pd(PPh3)$_4$ and an aqueous solution (5 ml) of 1.73 g (12.5 mmol) of potassium carbonate was added in a nitrogen atmosphere, and a reaction was performed at 90° C. for 40 hours. In this regard, XX-1 was a compound synthesized following the synthesis method described in Organic Letters, 8, 1713 (2006).

The reaction was stopped by adding water to the reaction container and, thereafter, a water layer was extracted by ethyl acetate. Separation and purification were performed by silica gel chromatography (mobile phase: hexane/ethyl acetate) so as to obtain a yellowish brown solid XX-2 (660 mg, yield of 42.2%).

(2) Synthesis of XX-3

In a 50-ml reaction container, 654 mg (2.10 mmol) of XX-2 was dissolved into anhydrous tetrahydrofuran (13 ml), and cooling to −70° C. was performed.

Subsequently, 1.5 ml (2.4 mmol of about 1.6 M hexane solution) of n-butyllithium solution was dropped and agitated for 5 minutes. Further, 0.46 ml (2.5 mmol) of chlorodiphenylphosphine was dropped. Thereafter, the temperature was increased to room temperature, and a reaction was performed for 15 hours.

The reaction solution was concentrated under reduced pressure, and separation and purification were performed by silica gel chromatography (mobile phase: toluene/ethyl acetate) so as to obtain a light yellow solid XX-3 (231 mg, yield of 26.4%).

(3) Synthesis of XX-4

A 15-ml reaction container was charged with 208 mg (0.5 mmol) of XX-3, 5.6 mg (0.025 mmol) of Pd(OAc)$_2$, and deaerated toluene (2 ml) and sealed by a stopper. A reaction was performed at 160° C. for 38 hours.

The reaction solution was cooled to room temperature, 30% aqueous hydrogen peroxide (100 μl) was added, and in that state, agitation was performed for 3 days. Methanol was added, and concentration under reduced pressure was performed. Thereafter, separation and purification were performed by silica gel chromatography (mobile phase: dichloromethane/methanol) so as to obtain a light yellow solid XX-4 (59 mg, yield of 33%).

(4) Synthesis of A-3

A 30-ml reaction container was charged with 58 mg (0.16 mmol) of XX-4, 297 mg (1.31 mmol) of 1-iodoheptane, and 0.5 ml of acetonitrile, and a reaction was performed for 15 hours while heat-refluxing was performed at 90° C. After the reaction was finished, precipitated crystals were filtrated and washed with acetone so as to obtain exemplary compound A-3 (65 mg, yield of 50%).

The structure of the resulting compound was identified by nuclear magnetic resonance spectroscopy (NMR) measurement. As a result, it was verified that the resulting compound was exemplary compound A-3 because the ratio of peak integral value was in accord with that of the structure of exemplary compound A-3. The measurement results of NMR spectrum are as described below.

$^1$H-NMR (DMSO-d$_6$) δ (ppm): 9.71 (d, 1H), 9.41 (d, 1H), 9.22 (d, 2H), 9.02 (d, 1H), 8.80 (d, 2H), 8.72 (d, 2H), 8.67 (d, 1H), 7.78 (m, 2H), 7.71 (t, 1H), 7.57 (m, 2H), 4.52-4.50 (m, 4H), 1.93 (br, 4H), 1.40-1.17 (br, 16H), 0.82 (t, 6H)

Example 2

Synthesis of Exemplary Compound A-4

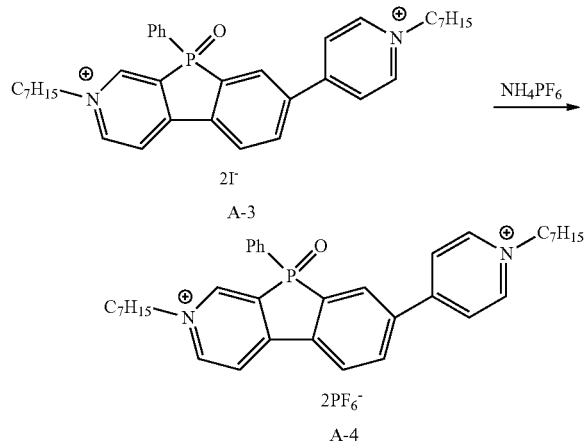

Exemplary compound A-3 (65 mg, 0.081 mmol) was dissolved into water. An aqueous solution in which 500 mg of potassium hexafluorophosphate was dissolved was dropped, and agitation was performed at room temperature for 3 hours. Precipitated crystals were filtrated and washed with water, isopropyl alcohol, and diethyl ether sequentially so as to obtain 56 mg of exemplary compound A-4 (yield of 82%). The structure of the resulting compound was identified by NMR measurement.

$^1$H-NMR (CD$_3$CN) δ (ppm): 8.99 (d, 1H), 8.84 (d, 1H), 8.73 (d, 2H), 8.56 (dd, 1H), 8.51 (dd, 1H), 8.43 (dd, 1H), 8.37 (dd, 1H), 8.31 (d, 2H), 7.78-7.66 (m, 3H), 7.59-7.51 (m, 2H), 4.52-4.50 (m, 4H), 1.96 (br, 4H), 1.45-1.19 (br, 16H), 0.88 (t, 6H)

Example 3

Evaluation of Electrochromic Characteristics

Regarding exemplary compound A-4 of example 2, transmittance spectrum measurement was performed in a decolorized state and a colored (reduction) state.

The transmittance spectrum measurement was performed by using a solution in which exemplary compound A-4 was dissolved (1.0×10$^{-3}$ mol/L) into a propylene carbonate solution (0.1 mol/L) of tetrabutylammonium perchlorate serving as a supporting electrolyte. This solution was placed into a glass cell having an optical path length of 1 mm, a mesh-like platinum electrode (working electrode) and a wire-like platinum electrode (counter electrode) were set, a reference electrode RE (Ag/Ag$^+$) was disposed, and a measurement was performed. This solution was subjected to constant-potential reduction at a potential higher than or equal to the reduction potential of the compound by using the transmitted light that passed through the mesh electrode. A potentiostat (CELLTEST 1470E) produced by Solartron was used for application of the voltage, and a spectroscope (USB2000-UV-VIS) produced by Ocean, Optics, Inc., was used for spectrometry.

Figure 5:
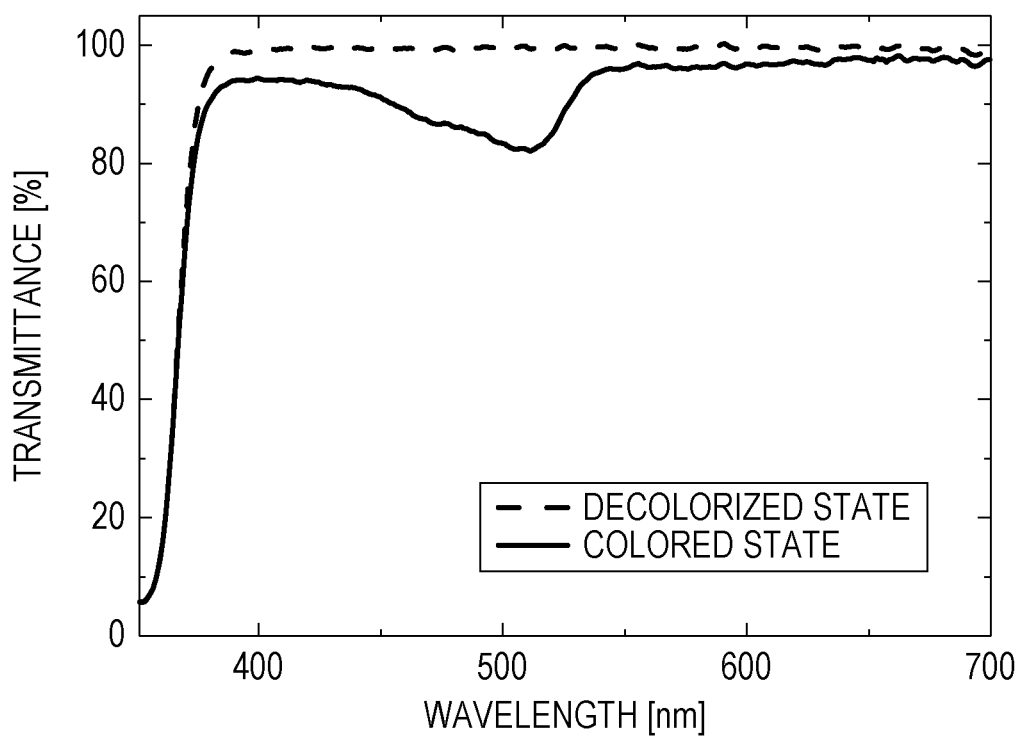
FIG. 5 is a diagram illustrating transmittance spectrum of exemplary compound A-4 in a decolorized state and a colored state in example 3.

Changes in transmittance spectra in a decolorized state and a colored state (reduction state) are illustrated in FIG. 5. In a decolorized state, exemplary compound A-4 did not have absorption in the entire visible light range and was a material having high transparency. On the other hand, in a reduction-colored state, the transmittance changed in the visible range, and the wavelength λmax of the maximum absorption peak was 504 nm. The reduction-colored state was returned to a colorless and transparent state due to oxidation again. Therefore, it was ascertained that the electrochromic characteristics were reversible in accordance with oxidation and reduction.

Example 4 and Comparative Example 1

Temperature Dependency of Absorption Spectrum

In the present example, a production example of the EC device 1 by using exemplary compound A-4 and the temperature dependency of the absorption spectrum thereof will be described.

An EC solution was prepared by dissolving each of exemplary compound A-4 of example 2 serving as a cathodic EC material and W-1 (5,10-diisopropyl-5,10-dihydrophenazine) serving as an anodic EC material into propylene carbonate at a concentration of 50.0 mM. The maximum absorption wavelength of W-1 in a colored state was 480 nm.

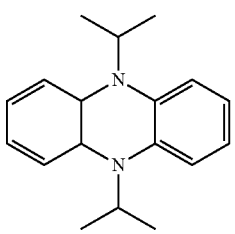

W-1

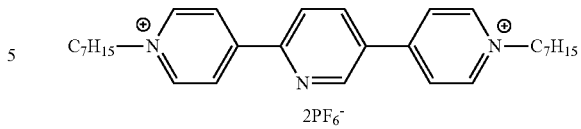

Ref-1

Next, the EC device 1 illustrated in FIG. 1 was produced by the method described below. Two substrates 10 with a transparent conductive film (ITO) were prepared as electrodes 11, and the two substrates 10 were disposed such that conductive surfaces (surfaces provided with the electrodes 11) faced each other and a predetermined distance was ensured between the substrates 10. Glass substrates were used for the substrates 10. Subsequently, an empty cell with an injection hole was produced by sealing the device peripheral portion of the two substrates 10 by an epoxy-based adhesive except for an injection hole for the solution through which the EC layer 12 was filled. At this time, the distance between the electrodes 11 was adjusted by forming a sealant 13 in which beads were mixed. The EC layer 12 was formed by filling the thus produced empty cell with the above-described EC solution through the opening portion of the cell by a vacuum injection method. Further, the EC device 1 was produced by sealing the opening portion of the cell by a UV-curable resin.

When 0.9 V of voltage was applied to the EC device 1, absorption caused by reduction species of exemplary compound A-4 and absorption caused by oxidation species of anodic EC compound W-1 were exhibited, and the EC device 1 was colored. The EC device 1 was decolorized when 0 V was applied, and reversible coloring and decolorization were exhibited. Regarding the EC characteristics, at each of 25° C. and 80° C., the EC device 1 was driven from the decolorized state to the colored state, and the absorption spectrum in a colored state was measured.

Figure 6A:
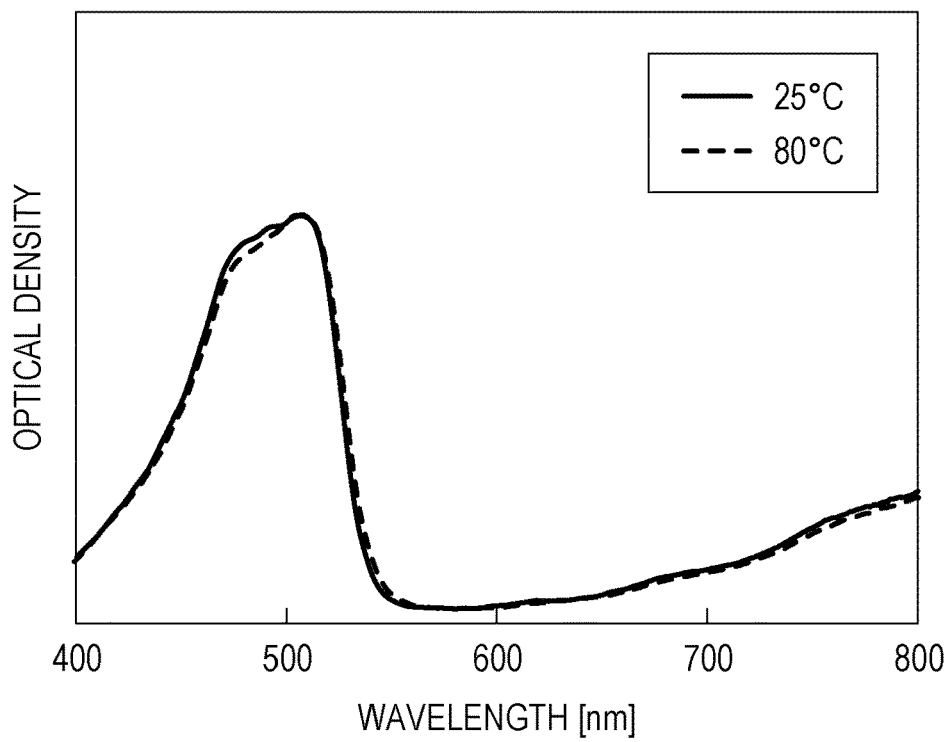
FIGS. 6A and 6B are diagrams illustrating the temperature dependency of the absorption spectra of EC devices in example 4 and comparative example 1, respectively.
Figure 6B:
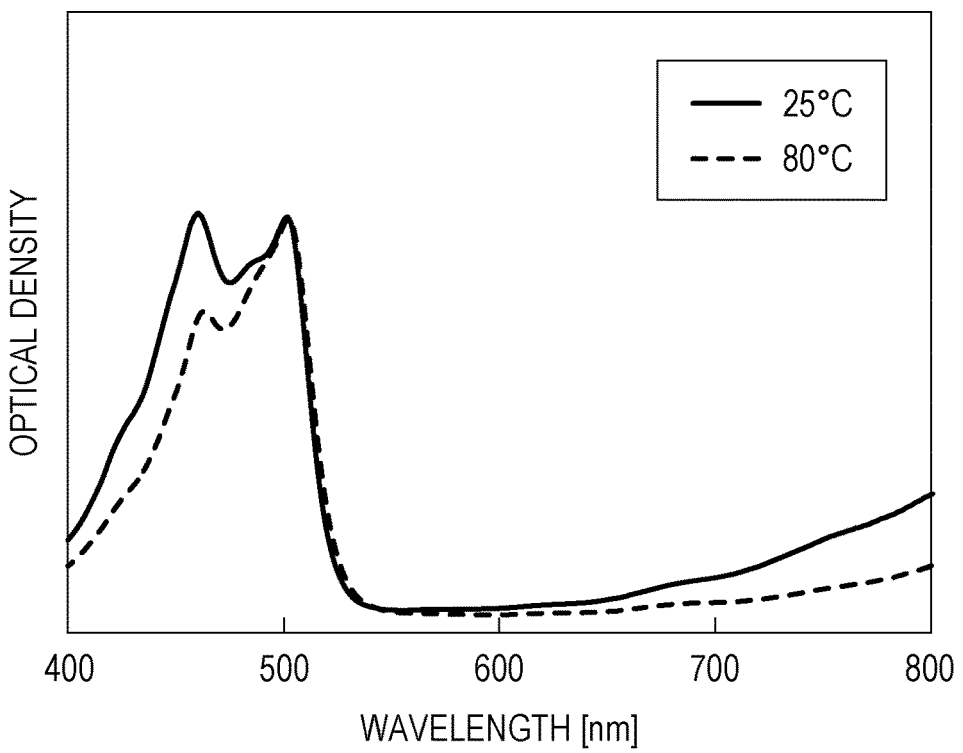

FIG. 6A is a diagram illustrating the absorption spectrum of the EC device containing exemplary compound A-4, that is, in the case in which the EC device according to the present embodiment was used. FIG. 6B is a diagram illustrating the absorption spectrum of the EC device containing Ref-1 described below instead of exemplary compound A-4, that is, an absorption spectrum in the case in which the EC device according to the comparative example was used. The absorption spectrum was measured when 5 seconds had elapsed from the start of drive, and the decolorized state was set to be the zero base line. The absorption spectrum acquired in a colored state at each temperature was normalized by a radical cation absorption peak wavelength of exemplary compound A-4 of 504 nm. In this regard, from evaluation of temperature characteristics of the compound alone, it was ascertained that the form of the absorption spectrum of anodic EC material W-1 was substantially maintained even when the temperature was changed. The structure of Ref-1 is as described below.

Cathodic EC compound Ref-1 of the comparative example in the reduction state had substantially the same coloring absorption wavelength as cathodic EC compound A-4 of example 2. More specifically, the maximum absorption wavelength in a colored state was 505 nm.

As illustrated in FIG. 6A, in the case of the EC device 1 containing exemplary compound A-4, the form of the spectrum was substantially maintained regardless of temperature. This result indicates that the ratio of monomers to associates of exemplary compound A-4 do not readily change in accordance with the temperature.

On the other hand, as a comparative example, regarding the EC device containing known cathodic EC compound Ref-1, the form of the absorption spectrum in a colored state changed in accordance with the temperature. Regarding Ref-1 of the comparative example, three pyridine rings serving as the EC portion had no substituent and, therefore, associates were readily formed. That is, Ref-1 was a mixture including associates and monomers released from the associated state due to thermal molecular vibration. It is conjectured that the absorption ratio changed because the presence ratio of associates to monomers changed in accordance with the temperature.

In this manner, the EC device containing compound Ref-1 of the comparative example exhibited large change in the absorption spectrum in accordance with temperature change and, therefore, EC device containing Ref-1 readily exhibited high temperature dependency.

Example 5 and Comparative Example 2

Figure 7A:
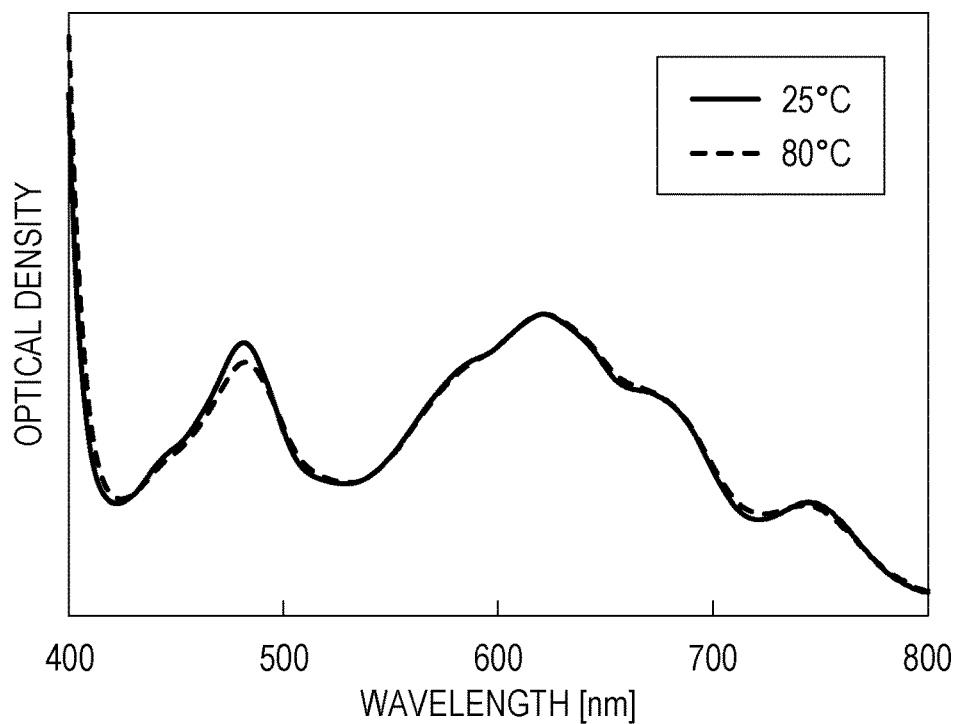
FIGS. 7A and 7B are diagrams illustrating the temperature dependency of the absorption spectra of EC devices in example 5 and comparative example 2, respectively.

In the present example, an EC device was produced in the same manner as example 4 except that an EC solution in which each of exemplary compound A-4 and C-5 described below was dissolved at a concentration of 25.0 mM instead of 50.0 mM of exemplary compound A-4 was used, and the absorption spectrum of the EC device in a colored state was measured. FIG. 7A is a diagram illustrating the absorption spectra of the EC device produced in example 5. The absorption peak of cathodic EC compound C-5 in a reduction-colored state was 619 nm and, therefore, the temperature dependency of the absorption spectrum of the compound was low.

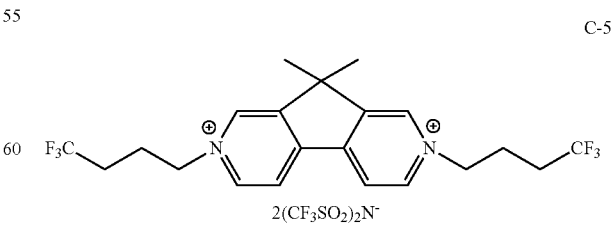

C-5

Figure 7B:
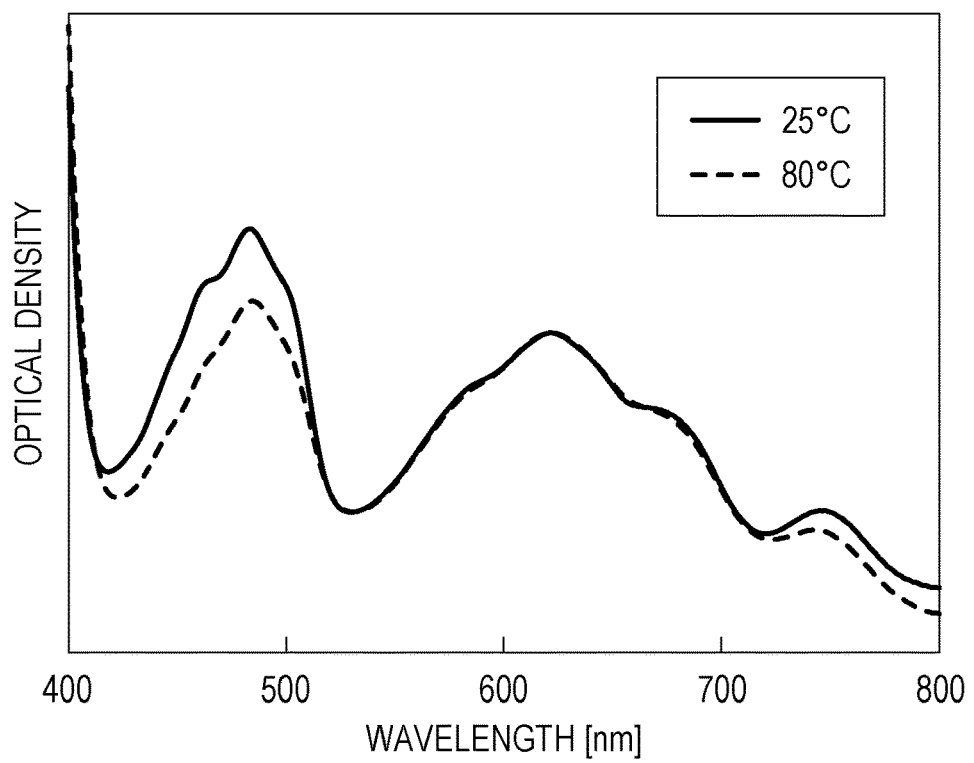

In comparative example 2, an EC device was produced in the same manner as comparative example 1 except that an EC solution in which each of compound Ref-1 and C-5 above was dissolved at a concentration of 25.0 mM instead of 50 mM of compound Ref-1 was used, and the absorption spectrum of the EC device in a colored state was measured. FIG. 7B is a diagram illustrating the absorption spectra of the EC device produced in comparative example 2.

As illustrated in FIG. 7A, regarding the device in which exemplary compound A-4 was mixed with another cathodic EC compound, it was ascertained that the form of the spectrum in a colored state was substantially maintained regardless of temperature. On the other hand, as illustrated in FIG. 7B, regarding the device in which compound Ref-1 was mixed with another cathodic EC compound, the absorption spectrum changed greatly in accordance with the temperature change.

As described above, according to the EC device of the present embodiment in the present disclosure, changes in the absorption spectrum of the EC device in accordance with temperature change are reduced than before. That is, an EC device having low temperature dependency is provided.

According to the present disclosure, an EC organic compound having an absorption spectrum with low temperature dependency in a colored state and having high absorbance is provided.

The organic compound according to an embodiment of the present disclosure has an absorption peak in a range in the vicinity of 500 nm in a colored state and the temperature dependency of the absorption spectrum in the colored state is sufficiently low. Therefore, the organic compound is usable for an EC device and for an optical filter, a lens unit, an image pickup apparatus, and the like that contain the EC device.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-123696 filed Jun. 28, 2018, which is hereby incorporated by reference herein in its entirety.

What is claimed is:

1. An organic compound denoted by formula [1] below,

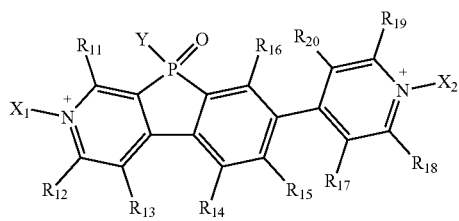

[1]

where each of $X_1$ and $X_2$ is independently selected from an alkyl group optionally having a substituent, an aryl group optionally having a substituent, and an aralkyl group optionally having a substituent, each of $R_{11}$ to $R_{20}$ is independently selected from a hydrogen atom, a halogen atom, and a substituent being any one of an alkyl group optionally having a substituent, an alkoxy group optionally having a substituent, an aryl group optionally having a substituent, and a heterocyclic group optionally having a substituent, and Y represents an alkyl group optionally having a substituent or an aryl group optionally having a substituent.

2. The organic compound according to claim 1, further comprising anions $A_1^-$ and $A_2^-$, wherein each of $A_1^-$ and $A_2^-$ independently represents a monovalent anion.

3. The organic compound according to claim 2, wherein $A_1^-$ and $A_1^-$ represent the same anion.

4. The organic compound according to claim 1, wherein Y represents the aryl group.

5. The organic compound according to claim 4, wherein Y represents a phenyl group optionally having a substituent.

6. The organic compound according to claim 1, wherein each of $X_1$ and $X_2$ represents the alkyl group and the carbon atom number of the alkyl group is 1 or more and 8 or less.

7. An electrochromic device comprising:
a pair of electrodes; and
an electrochromic layer disposed between the pair of electrodes,
wherein the electrochromic layer contains the organic compound according to claim 1.

8. The electrochromic device according to claim 7, wherein the electrochromic layer further contains a second electrochromic compound different from the organic compound.

9. The electrochromic device according to claim 8, wherein the second electrochromic compound is a compound having a visible light transmittance in an oxidation state lower than a visible light transmittance in a reduction state.

10. The electrochromic device according to claim 7, wherein the electrochromic layer contains at least five types of electrochromic compounds.

11. The electrochromic device according to claim 10, wherein the at least five types of electrochromic compounds include a viologen-based compound and a phenazine-based compound.

12. The electrochromic device according to claim 7, wherein the electrochromic layer is a solution layer.

13. The electrochromic device according to claim 12, wherein the electrochromic layer further contains a thickener.

14. The electrochromic device according to claim 13, wherein the weight ratio of the thickener is 20% by weight or less when the weight of the electrochromic layer is 100% by weight.

15. The electrochromic device according to claim 7, wherein viscosity of the electrochromic layer is 150 cP or less at 25° C.

16. An optical filter comprising:
the electrochromic device according to claim 7; and
an active device connected to the electrochromic device.

17. An image pickup apparatus comprising:
the electrochromic device according to claim 7; and
a light receiving device that receives light passing through the electrochromic device.

18. A window comprising:
a pair of transparent substrates;
the electrochromic device according to claim 7 that is disposed between the pair of transparent substrates; and
an active device connected to the electrochromic device.

19. An electrochromic mirror comprising:
the electrochromic device according to claim 7; and
a reflecting member.

* * * * *